US012520070B2

(12) United States Patent
Li et al.

(10) Patent No.: US 12,520,070 B2
(45) Date of Patent: Jan. 6, 2026

(54) SECURE ACTUATION WITH IN-EAR ELECTRONIC DEVICE

(71) Applicant: Huawei Technologies Co., Ltd., Shenzhen (CN)

(72) Inventors: Jian Li, Waltham, MA (US); Han Su, Ann Arbor, MI (US)

(73) Assignee: FutureWei Technologies, Inc., Addison, TX (US)

( * ) Notice: Subject to any disclaimer, the term of this patent is extended or adjusted under 35 U.S.C. 154(b) by 180 days.

(21) Appl. No.: 18/452,983

(22) Filed: Aug. 21, 2023

(65) Prior Publication Data

US 2023/0396913 A1 Dec. 7, 2023

Related U.S. Application Data

(63) Continuation of application No. PCT/US2021/019230, filed on Feb. 23, 2021.

(51) Int. Cl.
*H04R 1/10* (2006.01)

(52) U.S. Cl.
CPC ......... *H04R 1/1016* (2013.01); *H04R 1/1041* (2013.01); *H04R 1/1058* (2013.01); *H04R 2201/10* (2013.01); *H04R 2460/11* (2013.01)

(58) Field of Classification Search
CPC .. H04R 1/1016; H04R 1/1041; H04R 1/1058; H04R 2201/10; H04R 2460/11
See application file for complete search history.

(56) References Cited

U.S. PATENT DOCUMENTS

| | | | | |
|---|---|---|---|---|
| 5,638,826 | A | 6/1997 | Wolpaw et al. | |
| 5,751,820 | A * | 5/1998 | Taenzer | H04R 25/558 455/100 |
| 10,582,316 | B2 | 3/2020 | Petley et al. | |
| 10,694,299 | B2 | 6/2020 | Petley et al. | |

(Continued)

FOREIGN PATENT DOCUMENTS

| | | | |
|---|---|---|---|
| EP | 3181041 | A1 | 6/2017 |
| EP | 3264617 | A1 | 1/2018 |

OTHER PUBLICATIONS

Shih, Jerry J., et al., "Brain-Computer Interfaces in Medicine," Mayo Clinic, Mayo Foundation for Medical Education and Research, Mar. 2012, 12 pages.

(Continued)

*Primary Examiner* — Joseph Saunders, Jr.

(57) ABSTRACT

The disclosure relates to in-ear electronic devices. According to one aspect, the in-ear electronic device comprises a housing shaped to be inserted into an ear canal of a human, a set of electrodes configured to sense electrical signals when the housing is inserted into the ear canal, an antenna, a radio frequency (RF) transceiver, an audio transducer, and a control circuit. The control circuit is configured to provide an audio signal to the audio transducer based on an input RF signal received on the antenna, wherein the audio transducer plays the audio signal into the ear canal. The control circuit is configured to form an output signal based on one or more electrical signals from the set of electrodes. The control circuit is configured to passively backscatter the input RF signal on the antenna based on the output signal to wirelessly transmit the output signal.

12 Claims, 15 Drawing Sheets

(56) References Cited

U.S. PATENT DOCUMENTS

| | | | | |
|---|---|---|---|---|
| 2012/0309295 | A1* | 12/2012 | Maguire ................. | H02J 50/80 455/39 |
| 2018/0014741 | A1 | 1/2018 | Chou | |
| 2018/0368718 | A1 | 12/2018 | Koziol | |
| 2019/0053756 | A1* | 2/2019 | Ayers ................... | A61B 5/4812 |
| 2019/0166434 | A1 | 5/2019 | Petley et al. | |
| 2019/0209038 | A1 | 7/2019 | Saab et al. | |
| 2020/0154216 | A1 | 5/2020 | Petley et al. | |
| 2020/0275856 | A1 | 9/2020 | Valentin et al. | |
| 2020/0322737 | A1 | 10/2020 | Petley et al. | |
| 2020/0336847 | A1 | 10/2020 | Pontoppidan et al. | |

OTHER PUBLICATIONS

Abdulkader, Sarah N., et al., "Brain computer interfacing: Applications and challenges," Egyptian Informatics Journal 16, Jul. 2015, 18 pages.

Merrill, Nick, et al., "Classifying Mental Gestures with In-Ear EEG," IEEE 13th International Conference on Wearable and Implantable Body Sensor Networks (BSN), Jun. 2016, 5 pages.

Choi, Soo-In, et al,, "On the Feasibility of Using an Ear-EEG to Develop an Endogenous Brain-Computer Interface," Sensors, MDPI, Aug. 2017, 14 pages.

Curran, Max T., et al., "Passthoughts Authentication with Low Cost EarEEG," 38th Annual International Conference of the IEEE Engineering in Medicine and Biology Society (EMBC), Aug. 2016, 4 pages.

* cited by examiner

612

702 704 706

| Index | Bio-potential pattern | Actuation |
|---|---|---|
| 0 | Clenching teeth once | Speed dial: mom |
| 1 | Clenching teeth twice consecutively | Speed dial: 911 |
| 2 | Blink eyes three times consecutively | Stop reminders |
| 3 | Blink eyes two times consecutively | Activate reminders |
| 4 | Eyes move to left twice consecutively | Play relax music |
| 5 | Focus on letter “W” | Weather today? |
| 6 | Focus on letter “T” | Turn on laptop |

SECURE ACTUATION WITH IN-EAR ELECTRONIC DEVICE

CLAIM OF PRIORITY

This application is a continuation of PCT Patent Application No. PCT/US2021/019230, entitled “SECURE ACTUATION WITH IN-EAR ELECTRONIC DEVICE”, filed Feb. 23, 2021, the entire contents of which is hereby incorporated by reference.

FIELD

The disclosure generally relates to in-ear electronic devices.

BACKGROUND

An in-ear electronic device is an electronic device that is configured to fit within an ear canal of a human. An in-ear electronic device may be battery powered. There are technical challenges with reducing power consumption to thereby extend battery life.

BRIEF SUMMARY

According to one aspect of the present disclosure, there is provided an in-ear electronic device comprising a housing shaped to be inserted into an ear canal of a human, a set of electrodes configured to be in contact with the human when the housing is inserted into the ear canal, an antenna, a radio frequency (RF) transceiver coupled to the antenna, an audio transducer configured to play audio signals into the ear canal when the housing is inserted into the ear canal, and a control circuit coupled to the RF transceiver, the audio transducer, and the set of electrodes. The set of electrodes is configured to sense electrical signals. The RF transceiver is configured to form an audio signal based on the input RF signal. The control circuit is configured to provide an audio signal to the audio transducer based on an input RF signal received on the antenna, wherein the audio transducer plays the audio signal into the ear canal. The control circuit is configured to form an output signal based on one or more electrical signals from the set of electrodes. The control circuit is configured to passively backscatter the input RF signal on the antenna based on the output signal to wirelessly transmit the output signal.

Optionally, in any of the preceding aspects, the control circuit is configured to determine whether a magnitude of the input RF signal is above a threshold as a condition to passively backscatter the input RF signal on the antenna based on the output signal.

Optionally, in any of the preceding aspects, the control circuit is configured to modulate a carrier wave with the output signal in response to the magnitude of the input RF signal being less than the threshold; and transmit the modulated carrier wave on the antenna.

Optionally, in any of the preceding aspects, the control circuit is configured to process the one or more electrical signals to determine an actuation signal, and include the actuation signal in the output signal.

Optionally, in any of the preceding aspects, the control circuit is further configured to include the one or more electrical signals in the output signal. Optionally, in any of the preceding aspects, the one or more electrical signals comprise an electroencephalogram (EEG) signal.

Optionally, in any of the preceding aspects, the one or more electrical signals comprise an electromyogram (EMG) signal.

A further aspect comprises a method comprising receiving an input radio frequency (RF) signal at a radio frequency (RF) transceiver of an in-ear electronic device. The RF signal is received on an antenna coupled to the RF transceiver. The method comprises driving an audio transducer of the in-ear electronic device with an audio signal that is based on the input RF signal to play the audio signal into an ear canal of a human. The method comprises sensing one or more electrical signals from the ear canal with a set of electrodes of the in-ear electronic device. The method comprises forming, by a control circuit in the in-ear electronic device, an output signal based on the one or more electrical signals. The method comprises backscattering, passively, the input RF signal on the antenna based on the output signal to wirelessly transmit the output signal.

According to still one other aspect of the present disclosure, there is provided a system, comprising a target electronic device comprising a radio frequency (RF) transceiver, and an in-ear electronic device having a housing configured to fit within an ear canal of a human. The in-ear electronic device comprises: a set of electrodes comprising a reference electrode and at least one sensing electrode, wherein the set of electrodes is configured to sense one or more electrical signals from the ear canal; an antenna; an RF transceiver configured to receive an input RF signal on the antenna from the target electronic device, the RF transceiver configured to form an audio signal based on the input RF signal; an audio-transducer located on the housing such that the audio-transducer resides in the ear canal when the housing is inserted into the ear canal; and a processor coupled to the set of electrodes to receive the one or more electrical signals. The processor is coupled to the RF transceiver to receive the audio signal. The processor is coupled to the audio transducer. The processor is configured to: drive the audio transducer with the audio signal from the RF transceiver; and form an output signal based on one or more electrical signals from the set of electrodes. The RF transceiver is further configured to passively backscatter the input RF signal on the antenna based on the output signal to wirelessly transmit the output signal.

According to still one other aspect of the present disclosure, there is provided an in-ear electronic device comprising: a set of electrodes comprising a reference electrode and at least one sensing electrode. The set of electrodes is configured to sense one or more electrical signals from an ear canal of a human. The in-ear electronic device comprises an RF transceiver configured to receive an input RF signal from a target electronic device. The RF transceiver is configured to form an audio signal based on the input RF signal. The in-ear electronic device comprises an audio transducer configured to reside in the ear canal when the in-ear electronic device is inserted into the ear canal. The in-ear electronic device comprises a processor coupled to the set of electrodes to receive the one or more electrical signals. The processor is coupled to the RF transceiver to receive the audio signal, and the processor is coupled to the audio transducer. The processor is configured to: drive the audio transducer with the audio signal from the RF transceiver; schedule operations to determine an actuation signal that is based on the one or more electrical signals, wherein the operations are scheduled for one of the in-ear electronic device and the target device; perform the operations that are scheduled for the in-ear electronic device; and instruct the target device to perform the operations that are scheduled for the target device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
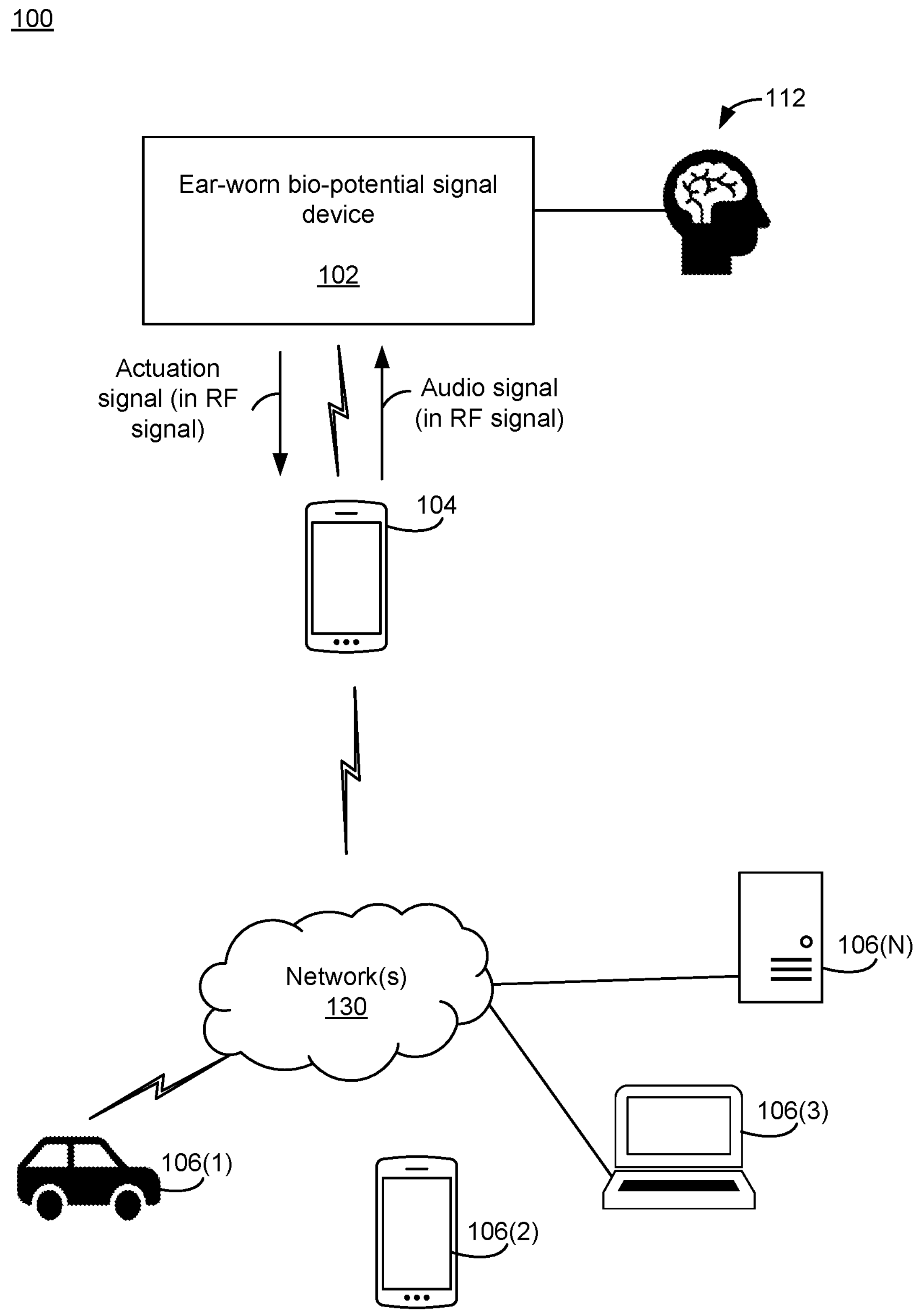
FIG. 1 depicts one embodiment of a system that uses electrical signals to control electronic devices.

The present disclosure will now be described with reference to the figures, which in general relate to in-ear electronic devices. In an embodiment, the in-ear electronic device allows a user to control a target device such as a cellular telephone. The user may control the target device based on an EEG from brain waves and/or and EMG from muscle actions. This provides for a much more secure way for the user to control the target device than if the user were to, for example, enter keystrokes on an interface of the target device, or submit a voice command to an interface of the target device.

The controlling the target device is referred to herein as "actuation", which means to cause a machine or device to operate. In some embodiments, the in-ear electronic device sends an actuation signal to the target device to cause the target device to perform some action, such as placing a telephone call. In some embodiments, the in-ear electronic device sends the electrical signals to the target device, which determines what action should be performed in response to the electrical signals. One of the technical challenges of operating the in-ear electronic device is that it may be battery powered. Therefore, preserving battery life is beneficial. In one embodiment, the in-ear electronic device uses passive backscatter transmission to send the actuation signal to the target device. In one embodiment, the in-ear electronic device uses passive backscatter transmission to send the electrical signals to the target device. Passive backscatter transmission consumes less power than active transmission, and hence increases battery life.

In some embodiments, operations are scheduled on the in-ear electronic device or, alternatively, on the target device based on factors such as battery level of the in-ear electronic device, a security preference of the user, and/or a privacy level of the user. In an embodiment, this allows battery life on the in-ear electronic device to be extended. In an embodiment, this creates a more secure environment by performing more operations on the in-ear electronic device.

It is understood that the present embodiments of the disclosure may be implemented in many different forms and that claim's scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 depicts one embodiment of a system 100 that uses electrical signals to control electronic devices. The electrical signals may include, but are not limited to, electroencephalogram (EEG) signals and electromyogram (EMG) signals. In one embodiment, the electrical signals are bio-potential signals. Bio-potentials are electrical potentials generated in living tissues or cells of living organisms.

The system 100 includes an in-ear electronic device 102 (or "in-ear electronic device"), a target electronic device 104 ("target device"), and may optionally include one or more other electronic devices 106(1)-106(N). The in-ear electronic device 102 is configured to be inserted into an ear canal of the human 112. The human may also be referred to herein as a user. There could be one in-ear electronic device 102 for each ear. The in-ear electronic device 102 may have a housing that fits into an ear canal of the human 112, which helps to discreetly play sounds to the user. The in-ear electronic device 102 has an audio transducer that is able to play the sounds, based on an audio signal. The audio transducer may be located in the ear canal when the in-ear electronic device is worn by the user.

In one embodiment, the in-ear electronic device 102 and target device 104 communicate using radio frequency (RF) signals. In one embodiment, the target device 104 sends an RF signal that contains an audio signal to the in-ear electronic device 102. An audio signal is a representation of a sound, typically using either a level of electrical voltage for analog signals, or a series of binary numbers for digital signals. The target device 104 might be a cellular telephone. The audio signal might be derived from a telephone call, from Internet content, from a file stored on the target device 104, etc. In one embodiment, the in-ear electronic device 102 sends an RF signal that contains an actuation signal to the target device 104.

In one embodiment, the in-ear electronic device 102 determines the actuation signal based on one or more electrical signals. The actuation signal specifies some action to be performed by one of the electronic devices 104, 106 in the system 100. The in-ear electronic device 102 may send the actuation signal to the target device 104 to instruct the target device 104 to perform that action. For example, the target device 104 may be instructed to place a telephone call.

Electronic device(s) 106(1)-106(N) may include, but are not limited to, any number of various devices, such as client or server based devices, desktop computers, mobile devices, special purposes devices, wearable devices, laptops, tablets, cell phones, automotive devices, servers, telecommunication devices, network enabled televisions, games consoles or devices, cameras, set top boxes, personal data assistants (PDAs) or any other computing device.

The target device 104 may communicate with the electronic devices 106 by way of one or more networks 130. Networks 130 may be wired or wireless and include public networks or private networks including, but not limited to local area networks (LAN), wide area networks (WANs), satellite networks, cable networks, WiMaX networks, and communication networks, such as LTE and 5G networks. Networks 130 may also include any number of different devices that facilitate network communications, such as switches, routers, gateways, access points, firewalls, base stations, repeaters, backbone devices, etc.

The target device 104, and electronic devices 106(1)-106 (N) can also include one or more communications interfaces to enable wired or wireless communications to allow the in-ear electronic device 102 to control a computing device by way of an actuation signal sent to the target device 104. The communications interface(s) may include one or more transceiver devices, for example, network interface controllers (NICs) such as Ethernet NICs, to send and receive communications over a network, such as network 130. Other examples include the communications interface being a transceiver for cellular, Wi-Fi, Ultra-wideband (UWB), BLUETOOTH or satellite transmissions. The communications interface can include a wired I/O interface, such as an Ethernet interface, a serial interface, a Universal Serial Bus (USB) interface, an INFINIBAND interface other wired interfaces.

The in-ear electronic device 102 provides a secure way to control one or more of the electronic devices 104, 106. For example, the user can place a phone call or provide a security code (or password) by controlling of their brain waves, which is more secure than the user entering the telephone number (or code, password, etc.) into a keypad using their hand. The user control is not limited to using brainwaves, as the user might also use musculature control to create an EMG upon which the actual signal is based. For example, the user might place an emergency phone call by clenching their teeth twice over a short period of time. The user control may be referred to herein as "implicit control" or "implicit secure control." The user control may be considered to be "implicit" as the system 100 is able, based on analysis of the electrical signals, to clearly understand the user's intent even though the user's intent is not explicitly revealed by the user.

Figure 2:
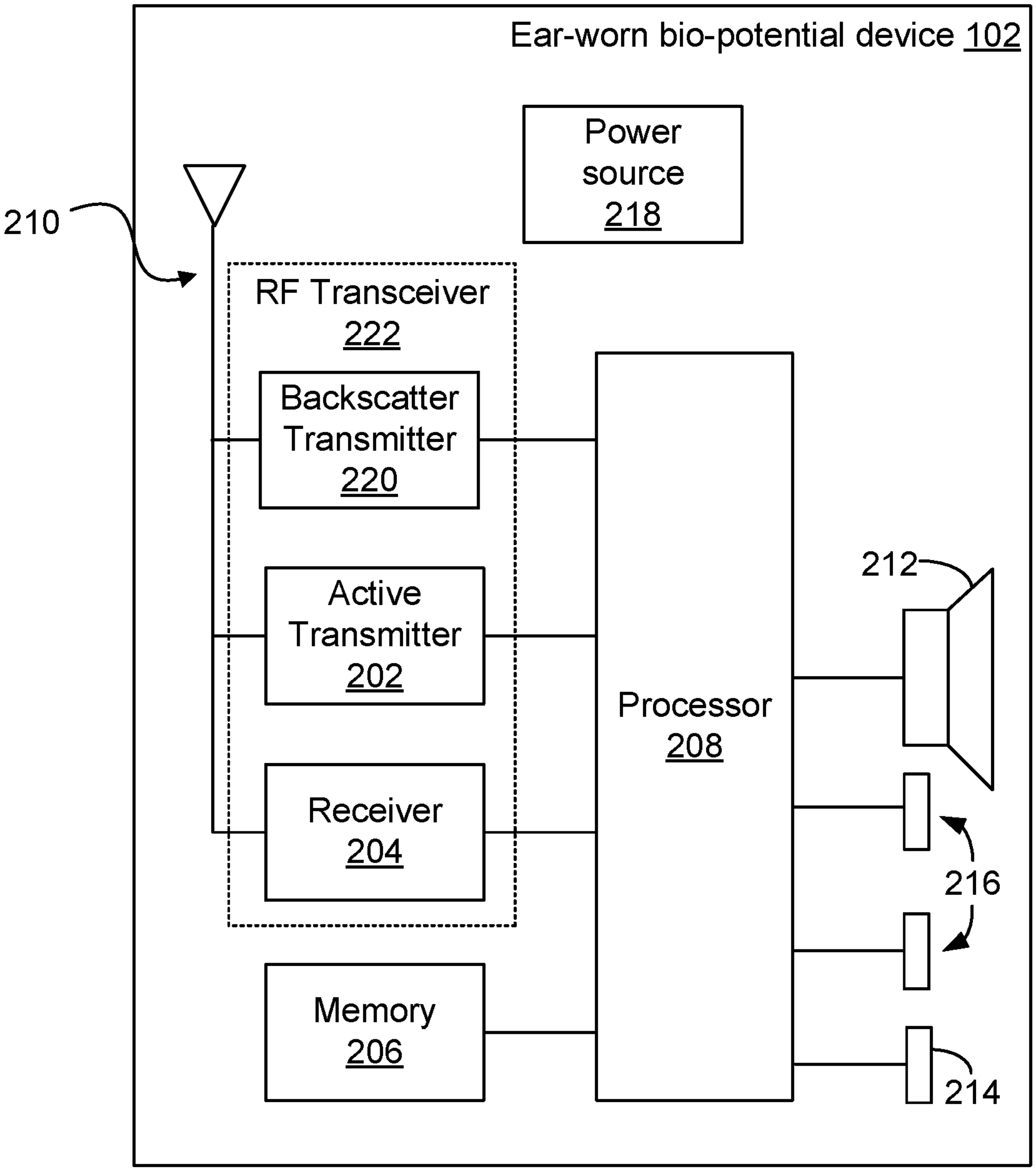
FIG. 2 depicts one embodiment of an in-ear electronic device.

FIG. 2 depicts one embodiment of an in-ear electronic device 102. In an embodiment, at least a portion of the in-ear electronic device 102 is configured to fit into an ear canal of the human. The in-ear electronic device 102 has an RF transceiver 222, processor 208, memory 206, audio transducer 212, reference electrode 214, sensing electrode 216, and power source 218.

The audio transducer 212 is configured to output a sound that is based on an audio signal from the processor 208. Typically, the audio transducer 212 is located in the in-ear electronic device 102 such that the sound is delivered into the ear canal. For example, a portion of the in-ear electronic device 102 that contains the audio transducer 212 may be configured to fit into the ear canal.

The reference electrode 214 provides a reference potential to an amplifier (not depicted in FIG. 2). The reference electrode 214 is one input to the amplifier and one of the sensing electrodes 216 is the other input to the amplifier. The electrical potential between the reference electrode 214 and the sensing electrode is therefore an electrical signal. Typically the electrodes 214, 216 are dry electrodes, which do not require an electrolytic gel. However, wet electrodes may also be used. Wet electrodes are typically used with an electrolytic gel between the electrode and the user's skin. The electrodes could be active electrodes or passive electrodes. An active electrode has a pre-amplification module between the electrode and the main amplifier. A passive electrode does not have a pre-amplification module.

The RF transceiver 222 has a receiver 204, an active transmitter 202, and a backscatter transmitter 220. The RF transceiver 222 is connected to one or more antennas 210. The backscatter transmitter 220 could also be referred to as a passive transmitter or a passive backscatter transmitter. The backscatter transmitter 220 is configured to use passive backscatter transmission to transmit an RF signal with an antenna 210. In some embodiments, the backscatter transmitter 220 is used when there is sufficient energy in an RF signal received on an antenna 210 for backscatter transmission; however, the active transmitter 202 is used when either there is not sufficient energy in the received RF signal or when the antenna 210 is not receiving an RF signal from the target device 104. The portion of the in-ear electronic device 102 that contains the RF transceiver 222 may be located outside of the ear canal or within the ear canal (when worn by the user). The same antenna 210 can be used for both transmitting and receiving RF signals, or alternatively, different antennas 210 can be used for transmitting signals and receiving signals.

In some embodiments, the backscatter transmitter 220 modulates a reflection of the input RF signal. In some embodiments, the backscatter transmitter 220 changes the impedance of the antenna 210 on which the RF signal is being received in order to modulate and reflect the RF signal. In some embodiments, the backscatter transmitter 220 either reflects or absorbs (i.e., does not reflect) the input RF signal in order to convey information. For example, reflecting the input RF signal may be used to transmit a "1", whereas absorbing the input RF signal may be used to transmit a "0".

The power source 218 is used to power various components in the in-ear electronic device 102. In one embodiment, the power source 218 is a battery. Using the backscatter transmitter 220 rather than the active transmitter 202 reduces power consumption and hence extends battery life.

The processor 208 is configured to control overall operation of the in-ear electronic device 102. The processor 208 may include, but is not limited to, one or more single-core processors, multi-core processors, central processing units (CPUs), graphics processing units (GPUs), general purpose graphics processing units (GPGPUs) or hardware logic components, such as accelerators and field-programmable gate arrays (FPGAs), application-specific integrated circuits (ASICs), system-on-a-chip (SoCs), complex programmable logic devices (CPLDs) and digital signal processors (DSPs). In some embodiments, the processor 208 and the RF transceiver 222 are a control circuit configured to perform functions described below in the flow charts.

The memory 206 stores instructions that are executed on the processor 208. The memory 206 is non-transitory memory and may be referred to as computer readable media. Computer readable media (or memory) may include computer storage media and/or communication media, which may comprise tangible storage units such as volatile memory, non-volatile memory or other persistent or auxiliary computer storage media, removable and non-removable computer storage media implemented in any method or technology for storage of information such as computer readable instructions, data structures or other data. Computer readable media may include tangible or physical forms of media found in device or hardware components, including but not limited to, random access memory (RAM), static RAM, dynamic RAM, read only memory (ROM), erasable programmable ROM (EPROM), electrically erasable programmable ROM (EEPROM), flash memory, optical storage, magnetic storage, storage arrays, network storage, storage area networks or any other medium that may be used to store and maintain information for access by a computing device.

Figure 3:
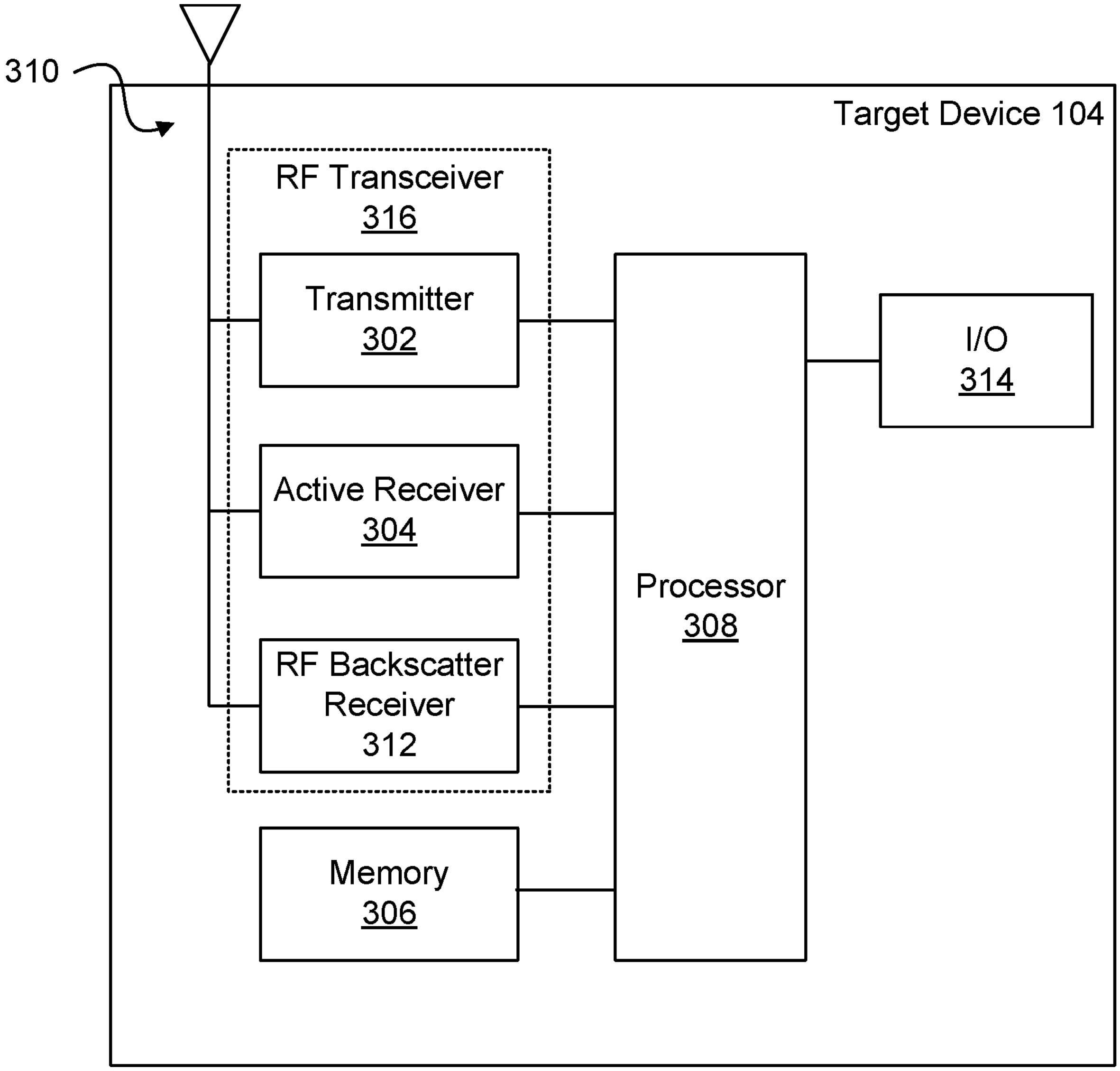
FIG. 3 is a block diagram of one embodiment of a target device.

FIG. 3 is a block diagram of one embodiment of a target device 104. The target device 104 may for example be a mobile telephone, but may be other devices in further examples such as a desktop computer, laptop computer, tablet, hand-held computing device, automobile computing device and/or other computing devices. As shown in the figure, the exemplary target device 104 is shown as including an RF transceiver 316, memory 306, at least one processor 308, and at least one input/output device 314. The processor 308 can implement various processing operations of the target device 104. For example, the processor 308 can perform signal coding, data processing, power control, input/output processing, or any other functionality enabling the target device 104 to operate in the system 100 (FIG. 1). The processor 308 may include any suitable processing or computing device configured to perform one or more operations. For example, the processor 308 may include a microprocessor, microcontroller, digital signal processor, field programmable gate array, or application specific integrated circuit.

The RF transceiver 316 includes a transmitter 302, an active receiver 304, and an RF backscatter receiver 312. The transmitter 302 can be configured to modulate data or other content for transmission by at least one antenna 310. The transmitter 302 can also be configured to amplify, filter and a frequency convert RF signals before such signals are provided to the antenna 310 for transmission. The transmitter 302 can include any suitable structure for generating signals for wireless transmission.

The active receiver 304 can be configured to demodulate data or other content received by the at least one antenna 310. The active receiver 304 can also be configured to amplify, filter and frequency convert RF signals received via the antenna 310. The active receiver 304 is an RF signal receiver, in some embodiments. The active receiver 304 can include any suitable structure for processing signals received wirelessly. The antenna 310 can include any suitable structure for transmitting and/or receiving wireless signals. The same antenna 310 can be used for both transmitting and receiving RF signals, or alternatively, different antennas 310 can be used for transmitting signals and receiving signals. The RF backscatter receiver 312 is configured to decode a backscattered RF signal.

The target device 104 further includes one or more input/output devices 314. The input/output devices 314 facilitate interaction with a user. Each input/output device 314 includes any suitable structure for providing information to or receiving information from a user, such as a speaker, microphone, keypad, keyboard, display, or touch screen.

In addition, the target device 104 includes at least one memory 306. The memory 306 stores instructions and data used, generated, or collected by the target device 104. For example, the memory 306 could store software or firmware instructions executed by the processor(s) 308 and data used to reduce or eliminate interference in incoming signals. In an embodiment, memory 306 stores software or firmware instructions executed by the processor(s) 308, as described herein. Each memory 306 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 4:
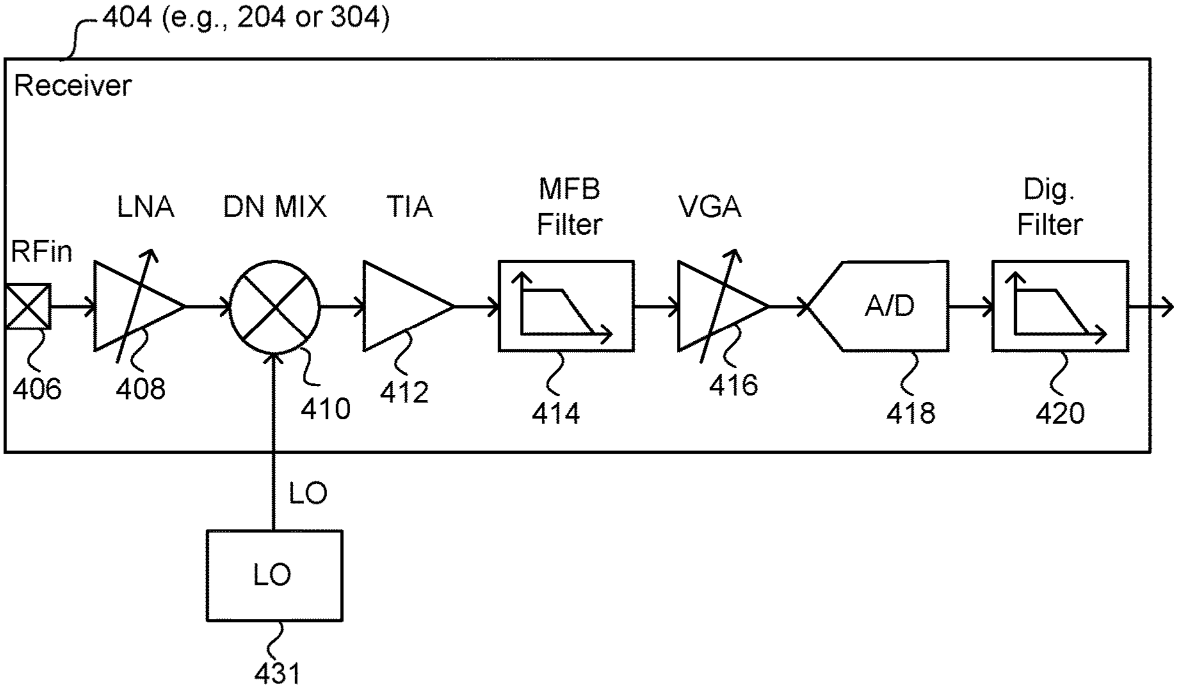
FIG. 4 is a block diagram of a receiver.

FIG. 4 is a block diagram of a receiver 404. The receiver 404 could be used for the receiver 204 in the in-ear electronic device 102 or the active receiver 304 in the target device 104. The receiver 404 demodulates an incoming radio frequency (RF) signal using synchronous detection driven by a local oscillator (LO) 431. The frequency of the local oscillator 431 may be very close to or equal to the carrier frequency of the desired signal. The receiver 404 may also be referred to as an RF signal receiver.

Referring to FIG. 4, the receiver 404 is shown as including an input 406 at which is received as a radio frequency (RF) signal, and thus, the input 406 can also be referred to as the RF input 406. The RF input 406 can be coupled to an antenna or a coupler, but is not limited thereto. The RF signal received by the RF input 406 is provided to a low noise amplifier (LNA) 408, which may have an adjustable gain. The LNA 408 amplifies the relatively low-power RF signal it receives without significantly degrading the signal's signal-to-noise ratio (SNR).

The amplified RF signal that is output by the LNA 408 is provided to a frequency mixer 410. The frequency mixer 410 may input signals at two frequencies $f_1$, $f_2$, and mix them to create two new signals, one at the sum $f_1+f_2$, and the other at the difference $f_1-f_2$. Typically, only one of these new signals is used. The frequency mixer 410 receives the amplifier RF signal from the LNA 408, and an oscillator signal (LO) from a local oscillator, as the two input signals.

Thus, the frequency mixer 410 may create a new signal from the amplifier RF signal and the oscillator signal. The frequency mixer 410 may shift (e.g., decrease) a frequency of the amplifier RF signal by a frequency of the oscillator signal to create the new signal. The amplifier RF signal may occupy a frequency range, in which case the frequency mixer 410 may shift the frequency range of the amplifier RF signal by a frequency of the oscillator signal. The frequency mixer 410 in FIG. 4 is a down-mixer (DN MIX) that frequency down-converts the amplified RF signal from a relatively high frequency to a baseband frequency, in one embodiment.

Still referring to FIG. 4, the frequency down-converted signal that is output from the mixer 410 is shown as being provided to a trans-impedance amplifier (TIA) 412. The TIA 412 acts as a current buffer to isolate a multi-feedback (MFB) filter 414 that is downstream of the TIA 412, from the mixer 410 that is upstream of the TIA 412. The MBF filter 414 low pass filters the frequency down-converted signal, to filter out high frequency signal components that are not of interest, such as HF noise. The filtered signal that is output from the MBF filter 414 is provided to a variable gain amplifier (VGA) 416, which is used to amplify the filtered signal before it provided to an analog-to-digital converter (A/D) 418, which converts the signal from an analog signal to a digital signal. The digital signal output from the A/D 418 is then provided to a digital filter 420, which performs additional filtering to remove out of band signal components and attenuates quantization energy from the A/D 418. The filtered digital signal that is output by the digital filter 420 is then provided to further digital circuitry that is downstream from the digital filter 420. Such further digital circuitry can include, for example, a digital signal processor (DSP), but is not limited thereto. The same DSP, or a different DSP, can be used to implement the digital filter 420.

The local oscillator 431 may include a voltage-controlled oscillator (VCO), a digital controlled oscillator (DCO), or other circuit that provides the LO signal. In one embodiment, the local oscillator 431 includes a phase-locked loop (PLL), which contains a VCO. The LO signal is provided to the mixer 410 for use in the down-conversion process. Although shown as outside of receiver 404, depending on the embodiment, the local oscillator 431 can be formed on the same integrated circuit as one or more of the other elements in FIG. 4.

In some embodiments, the receivers 204, 304 are direct conversion receivers. However, the receivers 204, 304 are not limited to being direct conversion receivers. For example, receivers 204, 304 could be superheterodyne receivers that have a frequency mixer that changes the incoming radio signal to an intermediate frequency. After processing the intermediate frequency signal, the superheterodyne receiver may have a frequency mixer that down-converts the processed intermediate frequency signal to a baseband signal.

Figure 5:
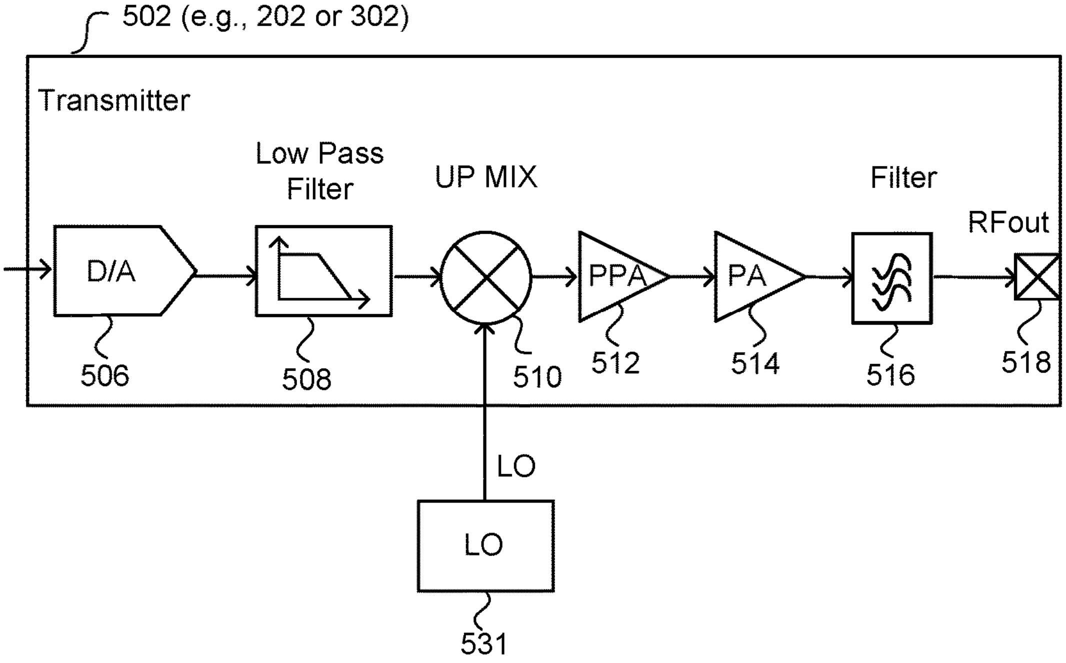
FIG. 5 is a block diagram of a transmitter.

FIG. 5 is a block diagram of a transmitter. The transmitter 502 could be used for the active transmitter 202 in the in-ear electronic device 102 or the transmitter 302 in the target device 104. In some embodiments, the in-ear electronic device 102 uses the active transmitter 202 when performing active RF transmission. However, when performing passive backscatter transmission, the in-ear electronic device 102 can avoid using elements such as the local oscillator (LO), thereby resulting in substantial power savings. Hence, battery life is extended.

Referring to FIG. 5, the transmitter 502 is shown as including an output 518 at which is provided as a radio frequency (RF) signal, and thus, the output 518 can also be referred to as the RF output 518. The RF output 518 can be coupled to an antenna or a coupler, but is not limited thereto. The RF signal provided by the RF output 518 is provided from a power amplifier PA 514 though the bandpass or notch filter 516. The filter 516 can, for example, be a duplex/SAW filter and is used to remove unwanted frequency components above and below the desired RF frequency range from the amplified RF output signal generated by PA 514. The power amp PA 514 receives its input from a power pre-amplifier PPA 512, which initially receives the up-converted signal to be transmitted from the mixer 510. PPA 512 may be referred to as a pre-amplification stage. PA 514 may be referred to as a power amplification stage.

Still referring to FIG. 5 the signal to be transmitted is received from the processor 208 of in-ear electronic device 102 of FIG. 2 or processor 308 of target device 104 of FIG. 3 at the digital to analog converter 506, with the digitized signal being filtered by low pass filter 508 to initially remove any high frequency noise before being up-converted at the frequency mixer 510.

Frequency mixer 510 may input signals at two frequencies $f_1$, $f_2$, and mix them to create two new signals, one at the sum $f_1+f_2$, and the other at the difference $f_1-f_2$. Typically, only one of these new signals is used. The analog version of the signal ("analog signal") is provided to frequency mixer 510, as one input signal. Frequency mixer 510 also receives oscillator signal LO from a local oscillator, as the other input signal. Thus, the frequency mixer 510 may create a new signal from the analog signal and the oscillator signal. The frequency mixer 510 may shift (e.g., increase) a frequency of the analog signal by a frequency of the oscillator signal to create the new signal. In one embodiment, the analog signal is a baseband signal. The oscillator signal is used as a carrier wave, in one embodiment. In one embodiment, the frequency mixer 510 modulates the oscillator signal (e.g., carrier wave) with the baseband signal to generate a radio frequency signal.

The analog signal may occupy a frequency range, in which case the frequency mixer 510 may shift the frequency range of the analog signal by a frequency of the oscillator signal. The frequency mixer 510 in FIG. 5 is an up-mixer (UP MIX) that frequency up-converts the analog signal. In one embodiment, the frequency mixer 510 is an up-mixer (UP MIX) that frequency up-converts the analog signal to an RF signal.

The local oscillator signal LO in FIG. 5 can be provided by a local oscillator 531. The local oscillator 531 may contain a VCO, DCO, or other circuit that provides the LO signal. The local oscillator 531 includes a PLL that contains a VCO, in one embodiment. The LO signal is provided to the frequency mixer 510 for use in the up-conversion process. Although shown as outside of transmitter 502, depending on the embodiment, the local oscillator 531 can be formed on the same integrated circuit as one or more of the other elements in FIG. 5.

In one embodiment, the transmitters 202, 302 are each direct conversion transmitters. However, the transmitter 202 in the in-ear electronic device 102 (shown in FIG. 2), as well as the transmitter 302 included in the target device 104 (shown in FIG. 3), are not limited to being direct conversion transmitters. For example, transmitters 202, 302 could be superheterodyne transmitters that have a frequency mixer that shifts the analog signal to an intermediate frequency signal. The frequency mixer modulates an oscillator signal with the analog signal to generate the intermediate frequency signal, in one embodiment. After processing the intermediate frequency signal, the superheterodyne transmitter may have a frequency mixer that up-converts the processed intermediate frequency signal to a radio frequency signal.

Figure 6A:
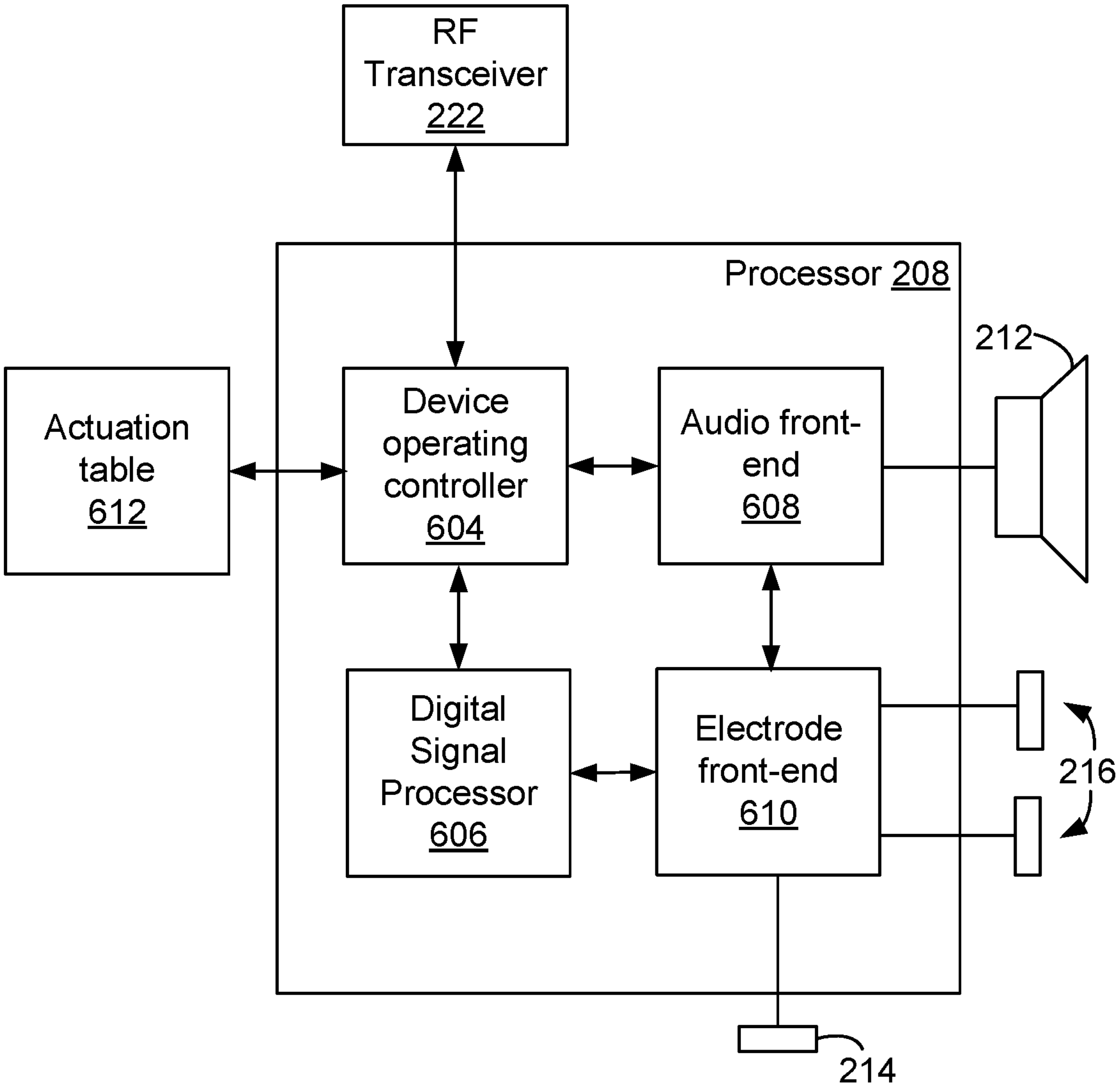
FIG. 6A provides further details for one embodiment of the processor in the in-ear electronic device, along with other components of the in-ear electronic device.

FIG. 6A provides further details for one embodiment of the processor 208 in the in-ear electronic device 102, along with other components of the in-ear electronic device 102. The processor 208 includes a device operating controller 604, a digital signal processor (DSP) 606, an audio front-end 608, and an electrode front-end 610. The device operating controller 604 is in communication with the RF transceiver 222 to be able to process the output of the receiver. As discussed above, the RF transceiver 222 includes a receiver (e.g., receiver 204), an active transmitter (e.g., active transmitter 202), and a passive backscatter transmitter (e.g., 220). Based on the receiver output, the device operating controller 604 provides an audio signal to the audio front-end 608. The audio front-end 608 drives the audio transducer 212 in order to play sound to the human, based on the audio signal. As discussed above, the audio transducer 212 may be located within the ear canal or proximate to the ear canal when the user is wearing the in-ear electronic device 102.

The electrode front-end 610 is connected to the reference electrode 214 and one or more sensing electrodes 216 in order to receive one more electrical signals. For each sensing electrode 216, the electrode front-end 610 amplifies the difference in electrical potential between the reference electrode 214 and that sensing electrode 216. Hence, for each sensing electrode 216, the electrode front-end 610 produces an electrical signal to a level suitable for electronic processing. The electrode front-end 610 filters the electrical signals to remove noise (e.g., 60 Hz power line interference). The filtering could include, but is not limited to, low-pass, high-pass, band-pass filtering. The electrode front-end 610 digitizes the electrical signals.

The one or more sensing electrodes 216 typically contact the human's skin when the human wears the in-ear electronic device 102. However, there could be a substance such as an electrolytic gel between the electrode and the skin. In one embodiment, the reference electrode 214 and one or more sensing electrodes 216 are dry electrodes, which do not require an electrolytic gel. However, the reference electrode 214 and the one or more sensing electrodes 216 may be wet electrodes. Typically, an electrolytic gel is applied between the wet electrode and the user's skin. In one embodiment, there are two sensing electrodes 216. In one embodiment, there are three sensing electrodes 216. There may be more than three sensing electrodes 216. The electrodes 214, 216 may be configured to sense in a variety of locations. An electrode can be located within the ear canal when the device 104 is inserted into the ear canal.

The DSP 606 processes the electrical signals from the electrode front-end 610. The processing may include pre-processing and feature extraction. The pre-processing may include, but is not limited to, a Fourier transform to the electrical signals. The DSP 606 may also extract features from the electrical signals. The DSP 606 passes the extracted features to the device operating controller 604.

The device operating controller 604 uses the extracted features to determine what, if any, actuations should be performed in the system 100. The actuation table 612 stores information to allow the processor 208 to determine what action should be performed in the system 100 if certain features are extracted from the electrical signals. In one embodiment, the device operating controller 604 implements a classifier. Examples of classifiers include, but are not limited to, support vector machine (SVM), linear discriminant analysis (LDA), and K nearest neighbors (KNN). In one embodiment, the device operating controller 604 searches the actuation table 612 to look for matches for the extracted features. Based on this matching, the device operating controller 604 may determine an actuation signal that is sent to the target device 104 using the RF transceiver 222.

The actuation table 612 may be stored in memory 206. In some embodiments, the actuation table is updated from time to time. Further details of one embodiment of an actuation table 612 are depicted in FIG. 7.

Figure 6B:
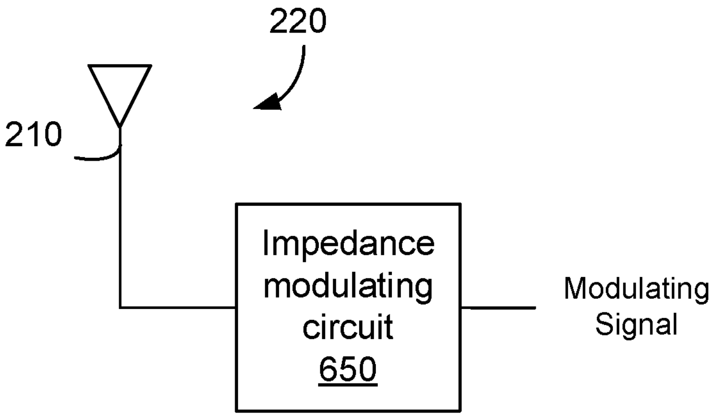
FIG. 6B provides further details for one embodiment of the passive backscatter transmitter in the in-ear electronic device.

FIG. 6B provides further details for one embodiment of the passive backscatter transmitter 220 in the in-ear electronic device 102. The impedance modulating circuit 650 is able to alter the impedance associated with the antenna 210. For example, the antenna 210 could be connected to ground to create a low impedance. In one embodiment, the impedance modulating circuit 650 has a transistor that is controlled by the modulating signal. Turning the transistor on will connect the antenna 210 to ground, thereby creating a low impedance. Turning the transistor off will create an open circuit, thereby creating a high impedance. The low impedance may be used to reflect the input RF signal on the antenna 210. The high impedance may be used to "absorb" the input RF signal on the antenna 210 (hence not reflect the RF signal).

Note that the passive backscatter transmitter 220 is able to reflect the input RF signal without generating a carrier wave with, for example, local oscillator 531. Hence, considerable power is saved. Thus, battery life is extended.

Figures 6C, 7:
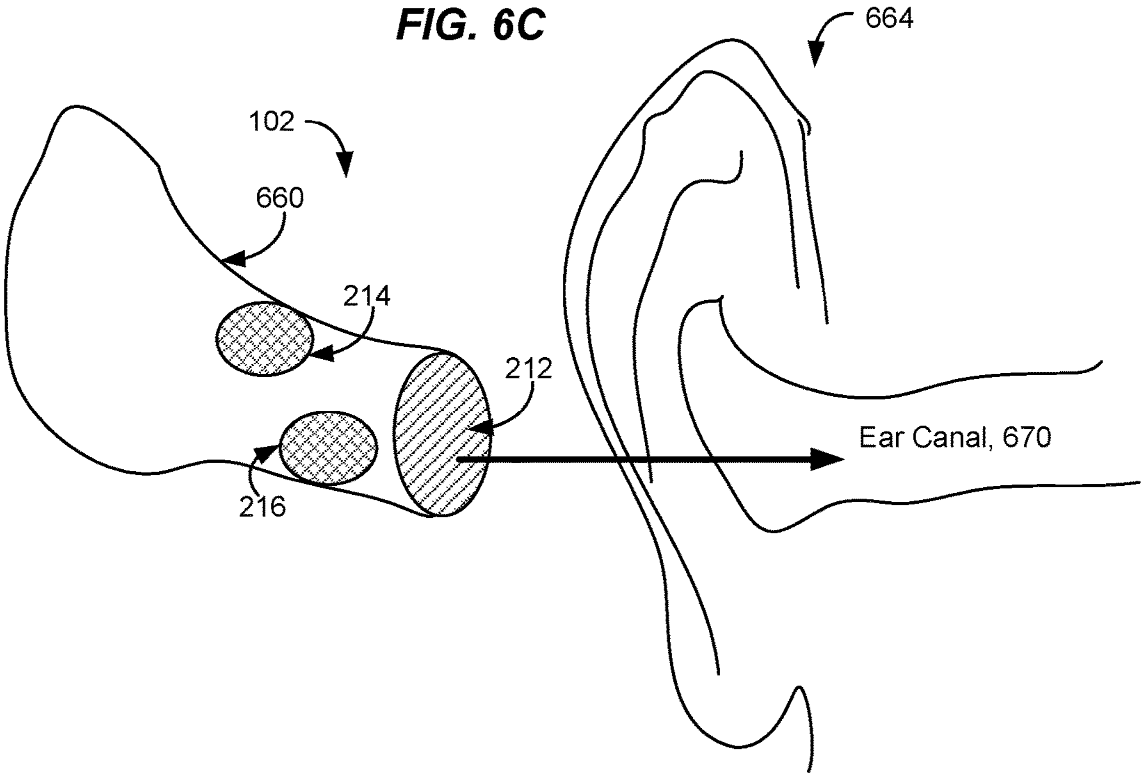
FIG. 6C provides further details for one embodiment of the in-ear electronic device.
FIG. 7 depicts one embodiment of an actuation table.

FIG. 6C provides further details for one embodiment of the in-ear electronic device 102, which is configured to fit into an ear canal of a human. The in-ear electronic device 102 has a housing 660, which may have a portion that is configured to fit within an ear canal 670 of the ear 664 of the user. The housing 660 may be constructed of a variety of materials. In some embodiments, the housing 660 is constructed from a soft or pliable material, such that the housing 660 may be inserted into the ear canal and remain snugly therein. A portion of the housing 660 may reside outside of the ear canal when the in-ear electronic device 102 is worn by the user.

The audio transducer 212 may be located on or within the portion of the housing that is configured to fit within an ear canal of the user. Electrodes 214, 216 may reside on the surface of the housing 660 or within the housing 660. A reference electrode 214 and a sensing electrode 216 are depicted, but there could be more sensing electrodes 216. The electrodes 214, 216 could be located on the housing 660 such that when the user wears the in-ear electronic device 102 the electrodes 214, 216 will be within the ear canal. Various circuitry (e.g., processor 208, memory 206, RF transceiver 222) may reside within the housing 660, but are not depicted in FIG. 6C.

FIG. 7 depicts one embodiment of an actuation table 612. The actuation table 612 is indexed (see index column 702) to permit searching or querying the actuation table 612. In this example, the actuation table 612 has seven rows, as indicated by indexes 0-6. Each row identifies characteristics of electrical signals (see pattern column 704), as well as an actuation (see column 706) if electrical signals having that characteristic is detected. As depicted in FIG. 7, the biopotential pattern for a given row correlates to some actuation. The table entry itself may be metadata that points to a data file, which describes unique characteristics of the electrical signals. The characteristics could be features that were extracted from electrical signals that previously resulted from the user performing the actuation list in the "bio-potential pattern" column (e.g., clenching teeth twice). However, the characteristics are not limited to extracted features.

A training or calibration session may be performed to add or update the bio-potential pattern. For example, the electrical signals that result from the user clenching their teeth once may be analyzed. Some information from the electrical signals may be stored either in the actuation table 612 or in a location pointed to by the table. As noted, this information might be features that were extracted from the electrical signals. Hence, the training or calibration may be used to construct the table 612. Also, from time to time, the bio-potential patterns may be updated (e.g., re-calibrated).

Figure 8:
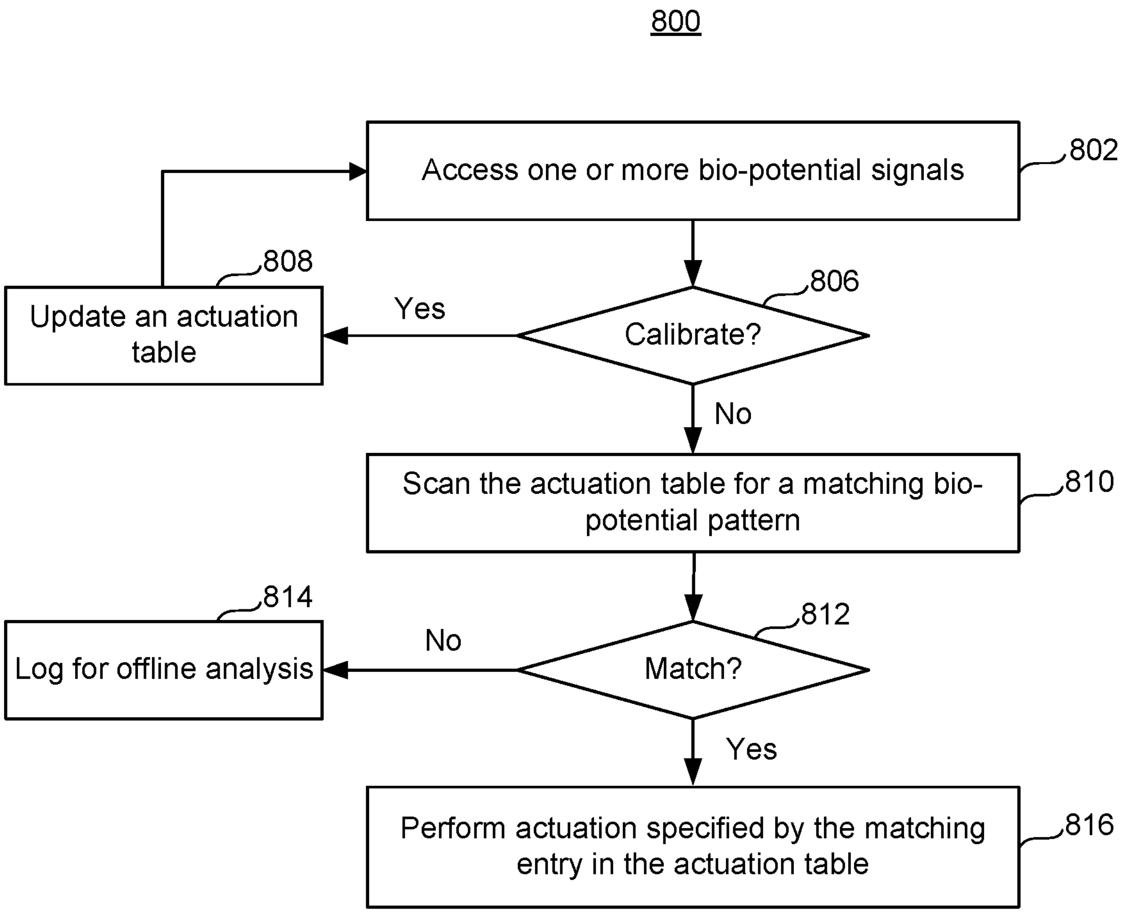
FIG. 8 is a flowchart of one embodiment of a process of secure implicit actuation based on an electrical signal captured by an in-ear electronic device.

FIG. 8 is a flowchart of one embodiment of a process 800 of secure implicit actuation based on an electrical signal captured by an in-ear electronic device 102. In one embodiment, some steps are performed by the in-ear electronic device 102 and others are performed by the target device 104. In one embodiment, all steps of process 800 are performed by the target device 104. In one embodiment, all steps are of process 800 performed by the in-ear electronic device 102.

Step 802 includes accessing one or more electrical signals. This step may include the in-ear electronic device 102 capturing the electrical signals with electrodes 214, 216. In one embodiment, there is an electrical signal for each sensing electrode 216. This step could include the target device 104 receiving the one or more electrical signals from the in-ear electronic device 102.

Step 806 includes a determination of whether calibration should be performed. Calibration refers to updating the actuation table 612. Calibration may also be referred to as training. If calibration is to be performed, then step 808 is performed. In one embodiment, calibration is performed during a calibration phase. In one embodiment, calibration is used to calibrate a classifier based on the electrical signals. In step 808, the pattern column 704 in the actuation table 612 is updated. For example, with reference to FIG. 7, the user may be asked to clench their teeth once in order to calibrate or train so that the system is better able to recognize this user action. Features may be extracted from the electrical signal that results from the user clenching their teeth. These features may be stored in the actuation table 612 as the pattern in the pattern column 704. Step 806 may be used to improve how well the features correlate to the user's action (e.g., clenching teeth). Hence, calibration helps to improve the accuracy of identifying the user's action.

If calibration is not to be performed (step 806 is no), then step 810 is performed. Step 810 includes scanning the actuation table 612 for a matching bio-potential pattern. In one embodiment, step 810 is performed during a runtime phase in which the classifier is used to analyze the electrical signals. In one embodiment, step 810 includes feature extraction. In an embodiment, feature extraction analyzes the electrical signals to look for the features in the pattern column 704 of the table 612. In step 810, the extracted features may be compared to the pattern in each row to look for a match. Hence, step 810 may be referred to as scanning the actuation table 612 for a matching bio-potential pattern.

Step 812 is a determination of whether a match was found in the actuation table 612. If match is found, then an actuation that is specified by the matching entry in the actuation table 612 is performed in step 816. For example, with respect to FIG. 7, if the matching entry was clenching teeth once, then the actuation is to speed dial a certain number (e.g., mom).

In some embodiments, the in-ear electronic device 102 performs steps 810 and 812, in which case step 816 may include the in-ear electronic device 102 sending an actuation signal to the target device 104, instructing the target device 104 to either perform the action itself or to have another device perform the action. For example, the in-ear electronic device 102 sends a code that corresponds to index 0 (see FIG. 7) to the target device 104. Then, the target device 104 executes the phone call specified in actuation column 706.

In some embodiments, the target device 104 performs steps 810 and 812, in which case the target device 104 may perform the action specified in actuation column 706 without any prompting from the in-ear electronic device 102. Optionally, the target device 104 may instruct another device to perform the action specified in actuation column 706. For example, with respect to FIG. 1, the target device 104 could instruct a laptop computer 106(3) to perform some action.

In some cases, a matching pattern is not found in the actuation table 612 (i.e., step 812 is no). In this case, some information may be logged in step 814 for offline analysis. This information may include the features that were extracted from the electrical signals. The offline analysis may be performed by any device in the system 100.

Figure 9:
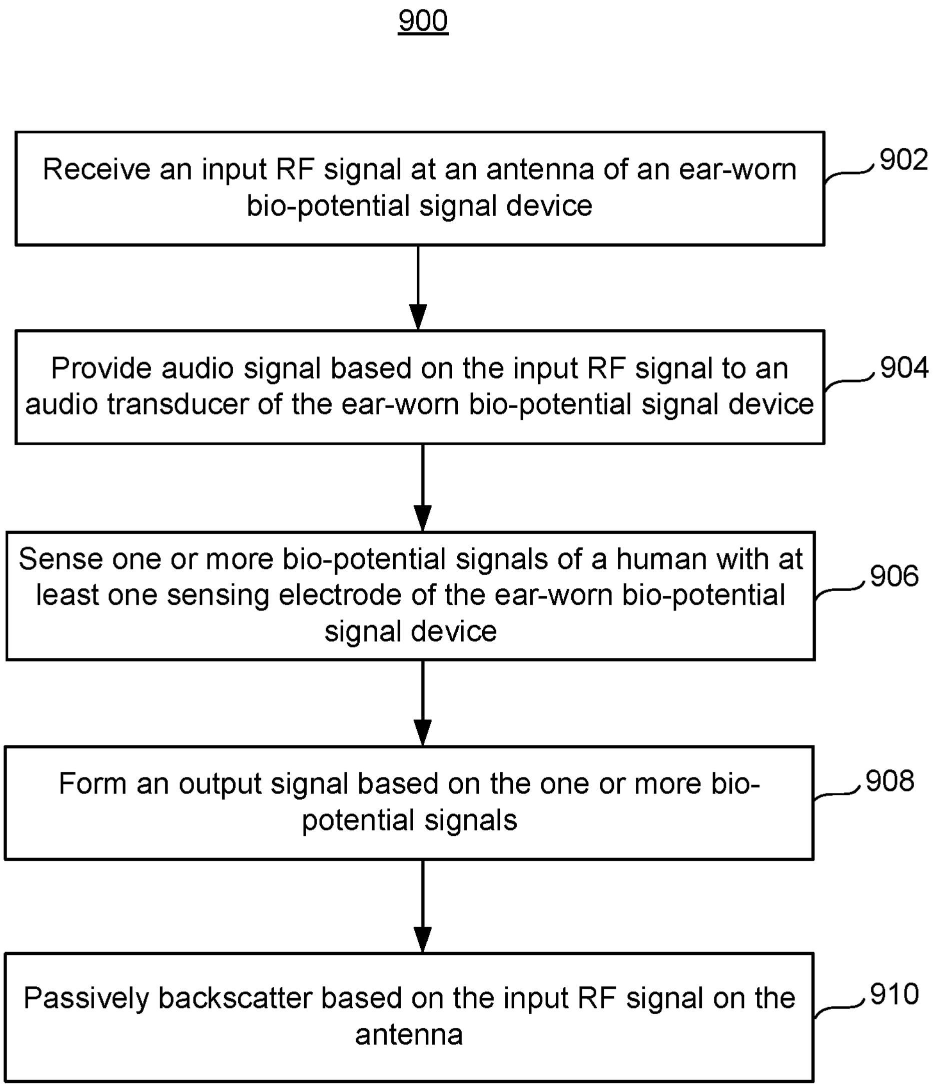
FIG. 9 is a flowchart of one embodiment of a process of passive backscatter based on an RF signal received from a target device.

FIG. 9 is a flowchart of one embodiment of a process 900 of passive backscatter based on an RF signal received from a target device 104. Passive backscatter uses energy of the received RF signal to facilitate transmission of an output RF signal. Using passive backscatter saves considerable power. The process 900 may be used to send either the electrical signals, or an actuation signal that is determined by analyzing the electrical signals. In an embodiment, the in-ear electronic device 102 performs process 900.

Step 902 includes receiving an input RF signal at an antenna 210 of an in-ear electronic device 102. In an embodiment, the RF signal is transmitted by the target device 104. In an embodiment, the input RF signal is used to transmit an audio signal to the in-ear electronic device 102. For example, the input RF signal is used by the target device 104 to transmit an audio signal that can be played by the audio transducer 212 of the in-ear electronic device 102.

Step 904 includes providing an audio signal based on the input RF signal to the audio transducer 212 of the in-ear electronic device 102. The audio transducer 212 then produces sound based on the audio signal. The sound may be played directly into the user's ear canal, although this is not a requirement.

Step 906 includes sensing one or more electrical signals of a human with at least one sensing electrode 216 of the in-ear electronic device 102. Note that a potential on the at least one sensing electrode 216 may be compared to a potential on a reference electrode 214. The one or more electrical signals may include an EEG and/or an EMG.

Step 908 includes forming an output signal based on the one or more electrical signals. In one embodiment, the output signal contains the one or more electrical signals. Thus, the output signal may be used to transmit the one or more electrical signals to, for example, the target device 104. In one embodiment, the output signal contains an actuation signal, which may be used to specify an actuation from table 612. Thus, the output signal may be used to instruct the target device 104 to perform some action based on the one or more electrical signals.

Step 910 includes passive backscatter based on the input RF signal on the antenna 210. Passive backscatter conserves power and thus extends battery life.

Figure 10:
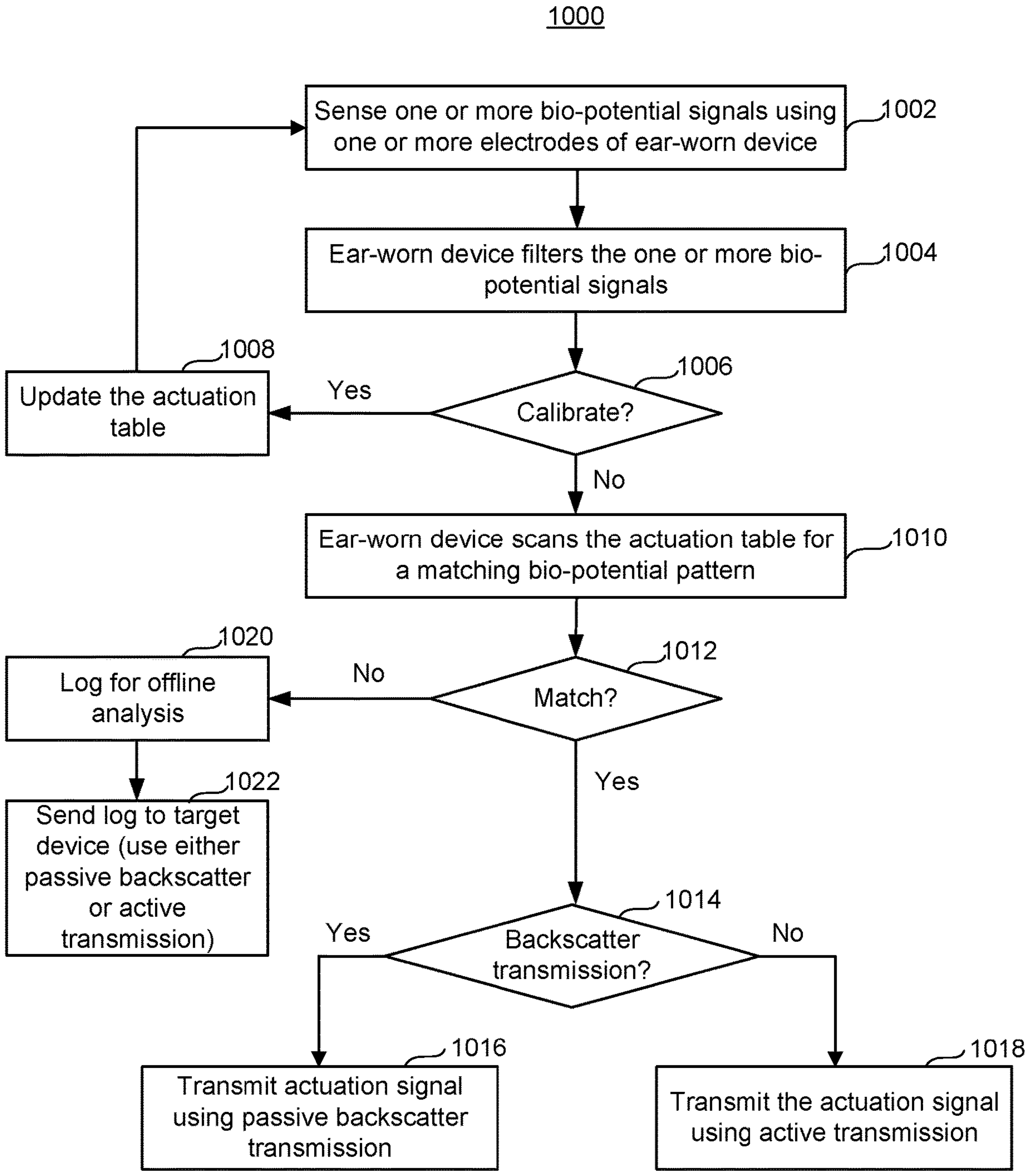
FIG. 10 is a flowchart of one embodiment of a process of selective passive backscatter by an in-ear electronic device.

FIG. 10 is a flowchart of one embodiment of a process 1000 of selective passive backscatter by an in-ear electronic device 102. The process 1000 uses passive backscatter if there is sufficient power in an RF signal received at the in-ear electronic device 102 from the target device 104. However, if there is not sufficient power in the RF signal, then energy from a power source (e.g., battery) in the in-ear electronic device 102 is used to, for example, generate a carrier wave.

Step 1002 includes sensing one or more electrical signals using one or more sensing electrodes 216 of the in-ear electronic device 102. The one or more electrical signals may include an EEG and/or an EMG.

Step 1004 includes the earn-worn device 102 filtering the one or more one electrical signals. The filtering may remove noise (e.g., 60 Hz power line interference). The filtering could include, but is not limited to, low-pass, high-pass, band-pass filtering. The electrode front-end 610 digitizes the electrical signals. Step 1004 may also include amplifying and digitizing the one or more one electrical signals.

Step 1006 includes a determination of whether calibration should be performed. If calibration is to be performed, then step 1008 is performed. In step 1008, the earn-worn device 102 updates the actuation table 612.

If calibration is not to be performed (step 1006 is no), then step 1010 is performed. Step 1010 includes the earn-worn device 102 scanning the actuation table 612 for a matching bio-potential pattern. In one embodiment, step 1010 includes feature extraction. In an embodiment, feature extraction analyzes the electrical signals to look for the features in the pattern column 704 of the table 612. In step 1010, the extracted features may be compared to the pattern in each row to look for a match. Hence, step 1010 may be referred to as scanning the actuation table 612 for a matching bio-potential pattern.

Step 1012 is a determination of whether the earn-worn device 102 finds a match in the actuation table 612. If match is found, then the earn-worn device 102 determines, in step 1014, whether backscatter transmission should be used to transmit an RF signal. In one embodiment, the use of backscatter transmission is conditioned on there being sufficient power in an incoming RF signal. Either step 1016 or step 1018 is performed, depending on whether backscatter transmission is used. Step 1016 includes the earn-worn device 102 transmitting an actuation signal using passive backscatter transmission. In one embodiment, the actuation signal specifies one of the actuations in the actuation table 612. In one embodiment, the earn-worn device 102 uses the backscatter transmitter 220 to transmit an RF signal to the target device 104, which sent the incoming RF signal. Step 1018 includes the earn-worn device 102 transmitting the actuation signal using active transmission. In one embodiment, the earn-worn device 102 uses the active transmitter 202 to transmit an RF signal to the target device 104.

In some cases, a matching pattern is not found in the actuation table 612 (i.e., step 1012 is no). In this case, some information may be logged in step 1020 for offline analysis. In step 1022, the earn-worn device 102 sends this logged information to the target device 104. The logged information may be sent by either active transmission or passive backscatter transmission.

Figure 11:
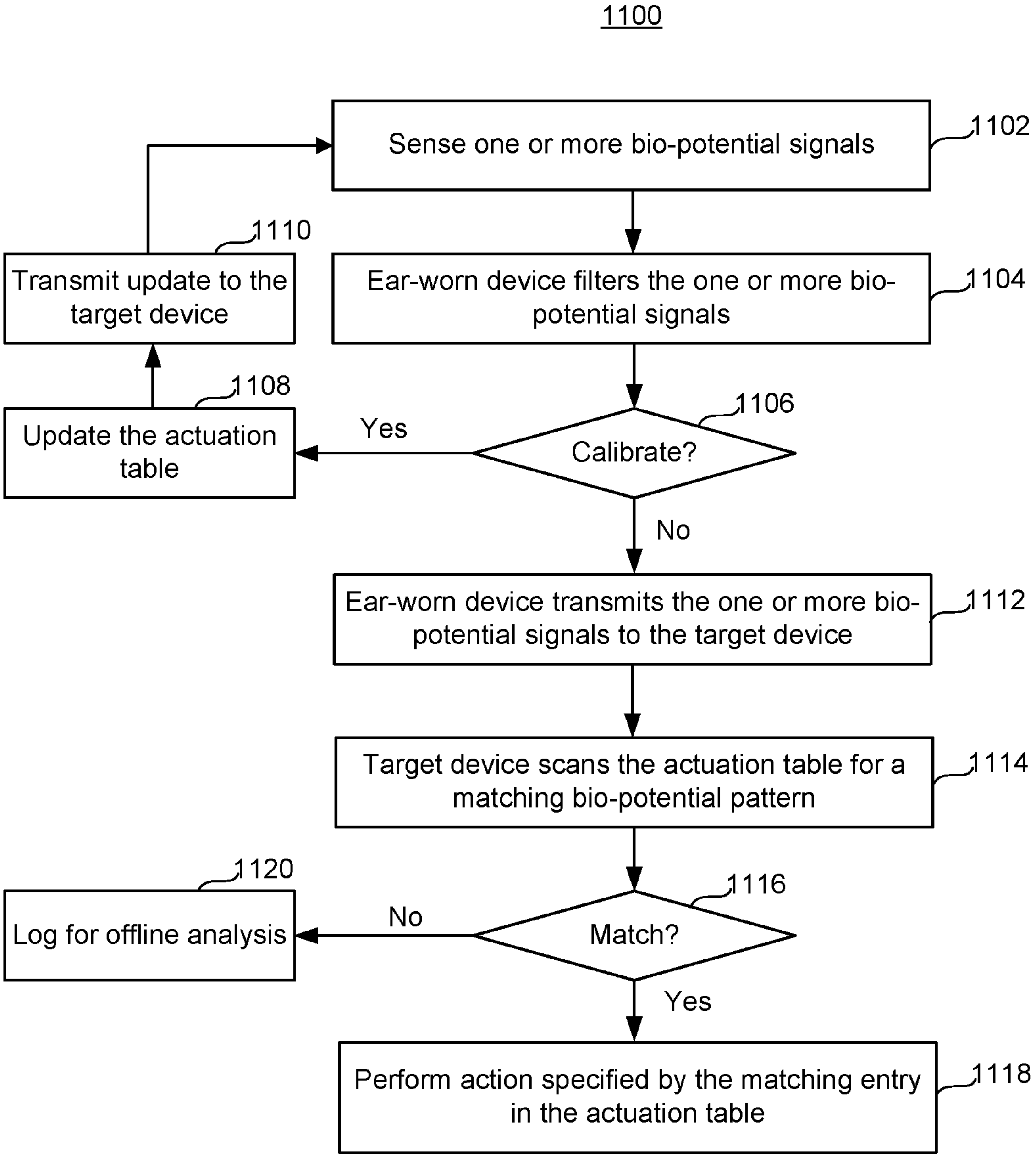
FIG. 11 is a flowchart of one embodiment of a process of secure implicit actuation based on an electrical signal captured by an in-ear electronic device.

As mentioned above, some of the steps in process 800 could be performed by either the earn-worn device 102 or the target device 104. FIG. 11 is a flowchart of one embodiment of a process 1000 of secure implicit actuation based on an electrical signal captured by an in-ear electronic device 102. In process 1100, steps 1102-1110 are performed by the in-ear electronic device 102, and steps 1112-1120 are performed by the target device 104. Since some of the steps are similar to those discussed above with respect to process 800, some of the steps with by only briefly discussed.

Step 1102 includes sensing one or more electrical signals. This step includes the in-ear electronic device 102 capturing the one or more electrical signals with electrodes 214, 216. The one or more electrical signals may include an EEG and/or EMG. Step 1104 includes the in-ear electronic device 102 filtering the one or more electrical signals. The one or more electrical signals may also be amplified and digitized.

Step 1106 includes the in-ear electronic device 102 determining whether calibration should be performed. Calibration, or training, refers to updating the actuation table 612. If calibration is to be performed, then the in-ear electronic device 102 updates the actuation table 612, in step 1108. A copy of the actuation table 612 may thus reside in non-transitory memory 206 on the in-ear electronic device 102. In step 1110, the update is transmitted to the target device 104. The update may be sent by backscatter transmitter 220 (using backscatter transmission). Alternatively, the update may be sent by active transmitter 202 (without backscatter transmission).

If calibration is not to be performed (step 1106 is no), then step 1112 is performed. Step 1112 includes the in-ear electronic device 102 transmitting the one or more electrical signals to the target device 104. The one or more electrical signals may be sent by backscatter transmitter 220 (using backscatter transmission). Alternatively, the one or more electrical signals may be sent by active transmitter 202 (without backscatter transmission). In some embodiments, the one or more electrical signals are digitized prior to transmission.

Step 1114 includes the target device 104 scanning the actuation table 612 for a matching bio-potential pattern. Step 1116 is a determination of whether a match was found in the actuation table 612. In one embodiment, step 1116 includes feature extraction. In an embodiment, feature extraction analyzes the electrical signals to look for the features in the pattern column 704 of the table 612. In step 1116, the extracted features may be compared to the pattern in each row to look for a match. Hence, step 1116 may be referred to as scanning the actuation table 612 for a matching bio-potential pattern. If match is found, then an actuation that is specified by the matching entry in the actuation table 612 is performed in step 1118. For example, with respect to FIG. 7, if the matching entry was clenching teeth once, then the actuation is to speed dial a certain number (e.g., mom).

In some cases, a matching pattern is not found in the actuation table 612 (i.e., step 1116 is no). In this case, some information may be logged in step 1120 for offline analysis.

Figure 12:
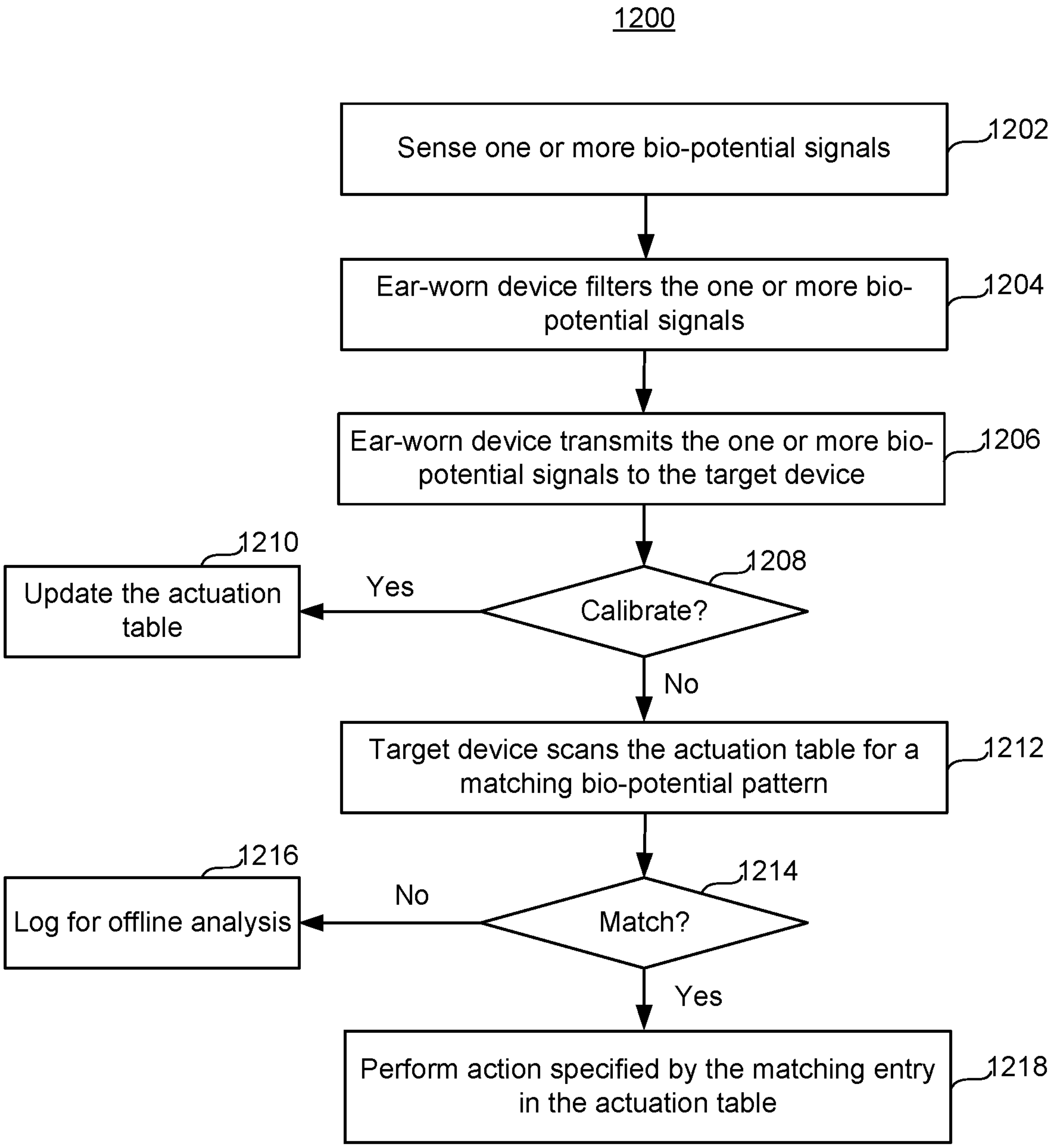
FIG. 12 is a flowchart of one embodiment of a process of secure implicit actuation based on an electrical signal captured by an in-ear electronic device.

As mentioned above, some of the steps in process 800 could be performed by either the earn-worn device 102 or the target device 104. FIG. 12 is a flowchart of one embodiment of a process 1200 of secure implicit actuation based on an electrical signal captured by an in-ear electronic device 102. In process 1200, steps 1202-1206 are performed by the in-ear electronic device 102, and steps 1208-1218 are performed by the target device 104. Since some of the steps are similar to those discussed above with respect to process 800, some of the steps with by only briefly discussed.

Step 1202 includes sensing one or more electrical signals. This step include the in-ear electronic device 102 capturing the one or more electrical signals with electrodes 214, 216. The one or more electrical signals could include an EEG and/or EMG. Step 1204 includes the in-ear electronic device 102 filtering the one or more electrical signals. The one or more electrical signals may also be amplified and digitized.

Step 1206 includes the in-ear electronic device 102 transmitting the one or more electrical signals to the target device 104. The one or more electrical signals may be sent by backscatter transmitter 220 (using backscatter transmission). Alternatively, the one or more electrical signals may be sent by active transmitter 202 (without backscatter transmission).

Step 1208 includes the target device 104 determining whether calibration should be performed. Calibration, or training, refers to updating the actuation table 612. If calibration is to be performed, then the target device 104 updates the actuation table 612, in step 1210. A copy of the actuation table 612 may thus reside in non-transitory memory 306 on the target device 104.

If calibration is not to be performed (step 1208 is no), then step 1212 is performed. Step 1212 includes the target device 104 scanning the actuation table 612 for a matching bio-potential pattern. Step 1214 is a determination of whether a match was found in the actuation table 612. If a match is found, then an actuation that is specified by the matching entry in the actuation table 612 is performed in step 1218. For example, with respect to FIG. 7, if the matching entry was clenching teeth once, then the actuation is to speed dial a certain number (e.g., mom).

In some cases, a matching pattern is not found in the actuation table 612 (i.e., step 1214 is no). In this case, some information may be logged in step 1216 for offline analysis.

Figure 13:
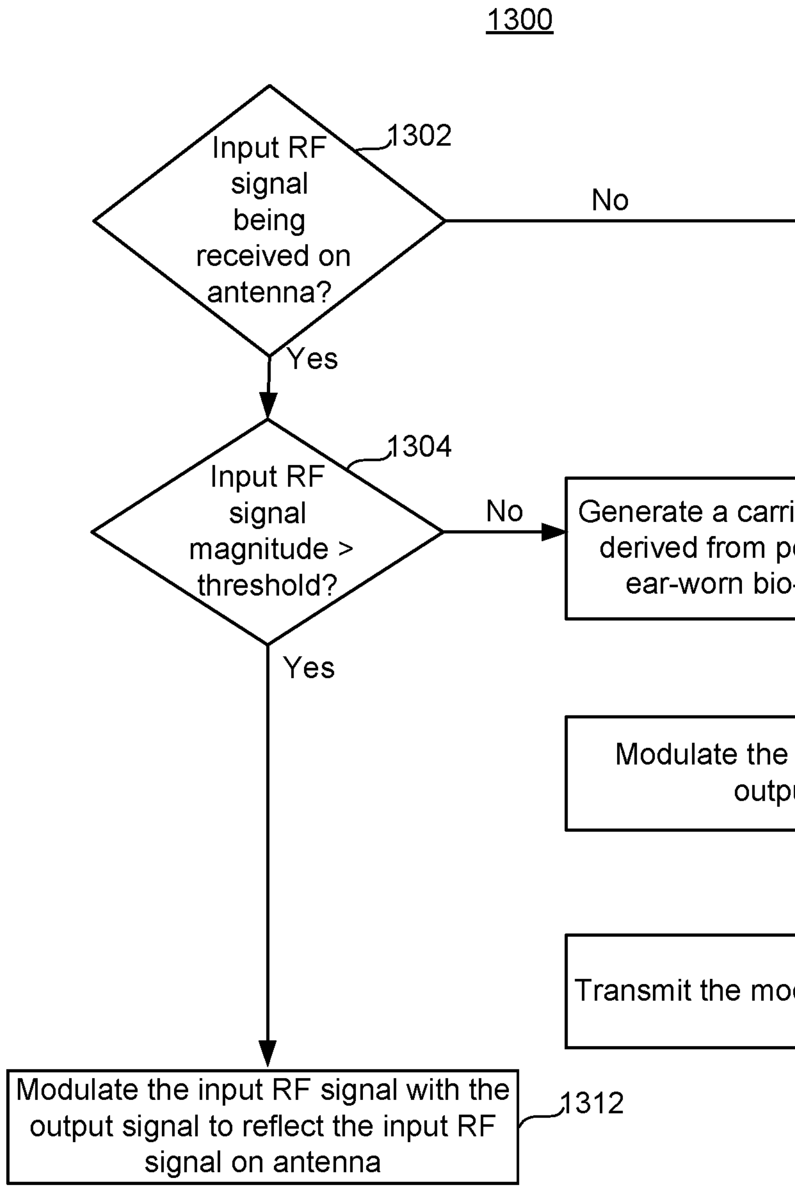
FIG. 13 is a flowchart of one embodiment of a process of backscatter transmission.

FIG. 13 is a flowchart of one embodiment of a process 1300 of backscatter transmission. The process could be used in step 910 of process 900, step 1016 or 1022 of process 1000, step 1110 and/or 1112 of process 1100, or step 1206 of process 1200.

Step 1302 includes the in-ear electronic device 102 determining whether an RF signal is being received on the antenna 210. If so, then the in-ear electronic device 102 determines whether a magnitude of the RF signal is above a threshold. This test is essentially a determination of whether there is sufficient energy in the RF signal to allow backscatter transmission to be adequately performed. That is, there should be sufficient energy in the RF signal such that backscatter transmission can be used to communicate a message to the target device 104.

If the magnitude of the RF signal is not above the threshold, then step 1306 is performed. Steps 1306-1310 describe one embodiment of active transmission. Step 1306 includes using a power source 218 in the in-ear electronic device 102 to generate a carrier wave. Step 1308 includes modulating the carrier wave with an output signal. The output signal could include, one or more electrical signals. The output signal could include an actuation signal. Step 1310 includes transmitting the modulated carrier wave. Steps 1308 and 1310 may be performed by the active transmitter 202. In the event that an RF signal is being received on an antenna, the antenna on which the modulated carrier wave is transmitted may be a different antenna than the one on which the RF signal is being received.

If the magnitude of the RF signal is above the threshold, then step 1312 is performed. Step 1312 includes modulating the input RF signal with an output signal. This output signal is the one that would otherwise had been used in step 1308, had active transmission been used. Step 1312 also reflecting the input RF signal on the antenna.

Figure 14:
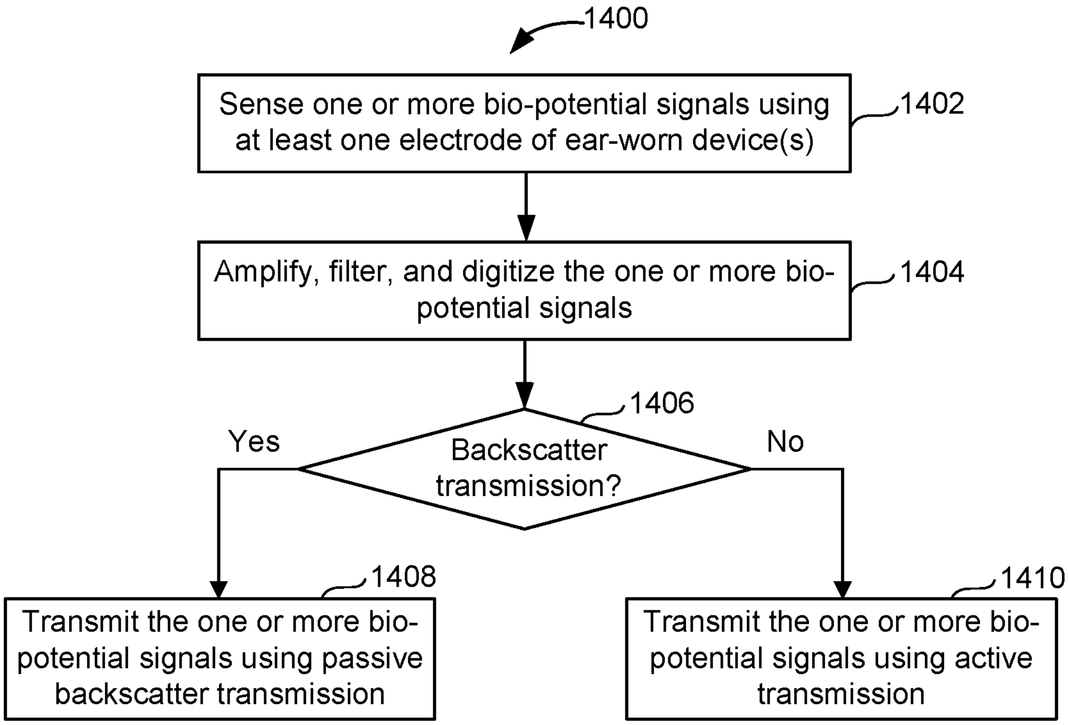
FIG. 14 is a flowchart of one embodiment of a process of sensing and transmitting electrical signals.

FIG. 14 is a flowchart of one embodiment of a process 1400 of sensing and transmitting electrical signals. Process 1400 is performed by the in-ear electronic device 102. Process 1400 may be used in combination with process 800 in an embodiment in which step 802 is performed at the target device 104. Process 1400 may be in steps 1102, 1104 and 1112 of process 1100. Process 1400 may be in steps 1202-1206 of process 1200.

Step 1402 includes sensing one or more electrical signals using one or more sensing electrodes 216 of the in-ear electronic device 102. The one or more electrical signals may include an EEG and/or EMG. Step 1404 includes amplifying, filtering, and digitizing the one or more electrical signals.

Step 1406 is a determination of whether backscatter transmission should be used to transmit the one or more electrical signals. The determination may be made as described above in steps 1302 and 1304.

Step 1408 includes the earn-worn device 102 transmitting the one or more electrical signals using passive backscatter transmission. In one embodiment, the earn-worn device 102 uses the backscatter transmitter 220 to transmit an RF signal to the target device 104, which sent the incoming RF signal.

Step 1410 includes the earn-worn device 102 transmitting the one or more electrical signals using active transmission. In one embodiment, the earn-worn device 102 uses the active transmitter 202 to transmit an RF signal to the target device 104.

Figure 15:
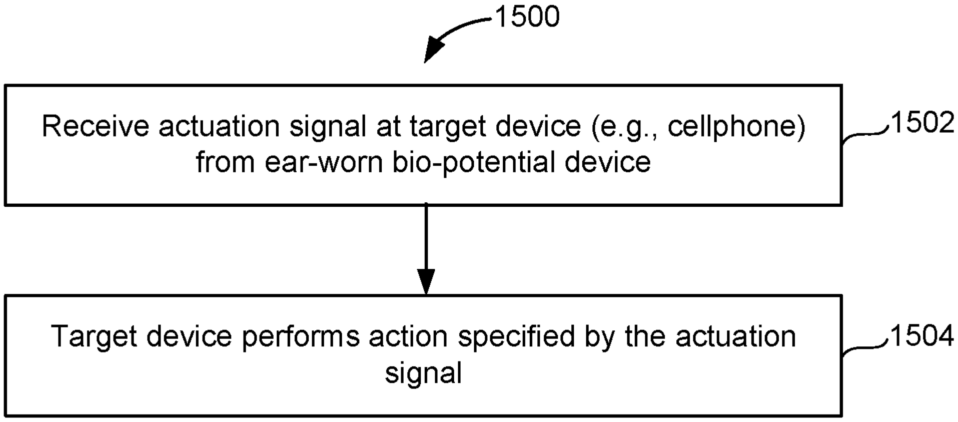
FIG. 15 is a flowchart of one embodiment of a process of performing an action at target device in response to an actuation signal.

FIG. 15 is a flowchart of one embodiment of a process 1500 of performing an action at target device 104 in response to an actuation signal. Process 1500 may be used in an embodiment in which most of the operations in process 800 are performed on the earn-worn device 102. Process 1500 may be performed in step 816 of process 800. Step 1502 includes the target device 104 receiving an actuation signal from the in-ear electronic device 102. Step 1504 includes the target device 104 performing an action specified by the actuation signal. For example, the target device 104 performs one of the actions in the actuation column 706 of actuation table 612.

Figure 16:
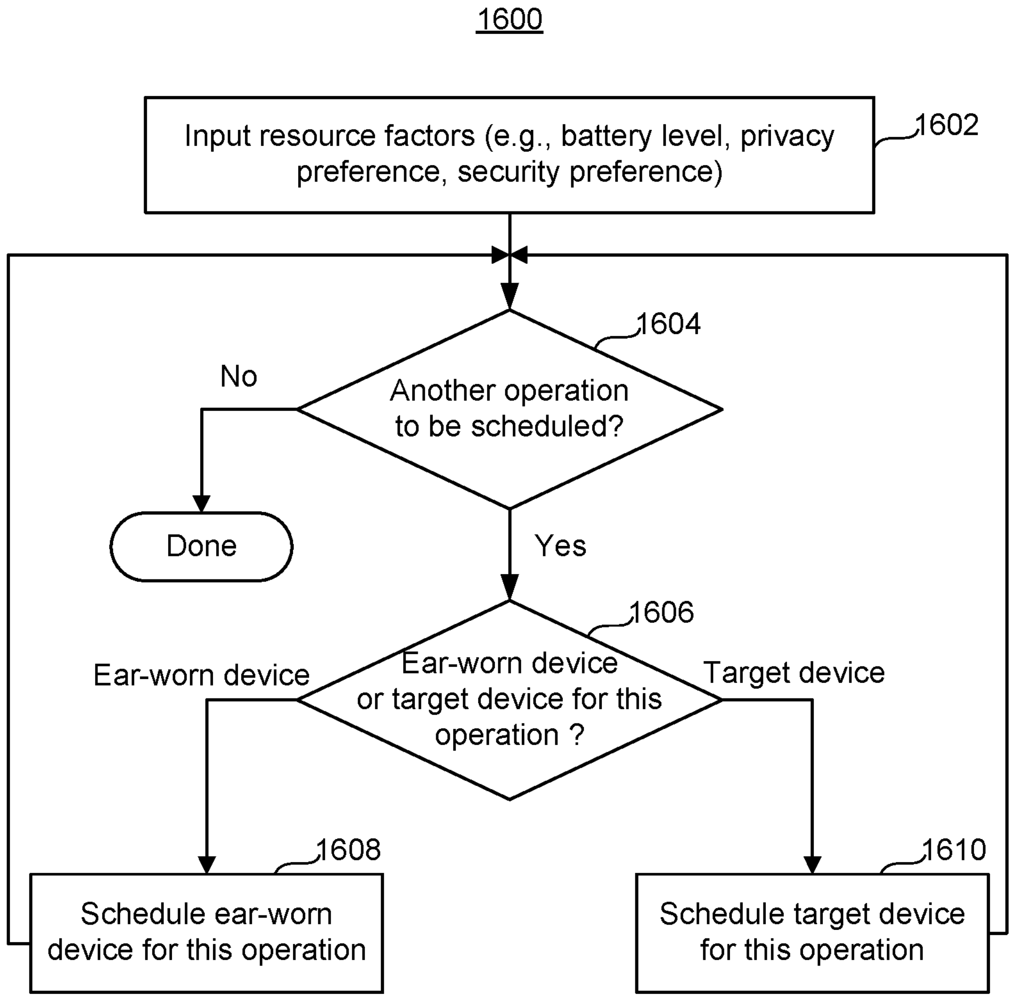
FIG. 16 is a flowchart of one embodiment of a process of scheduling operations for either the earn-worn device or the target device.

In some embodiments, there is a certain amount of flexibility with respect to which operations in, for example, process 800 are performed on the earn-worn device 102 and which operations are performed on the target device 104. This flexibility may be used to extend battery life, while meeting privacy and security preferences of the user. FIG. 16 is a flowchart of one embodiment of a process 1600 of scheduling operations for either the earn-worn device 102 or the target device 104. Process 1600 could be performed by the earn-worn device 102, the target device 104, or another device.

Step 1602 includes inputting resource factors. The resource factors will be used to determine which operations to schedule for the earn-worn device 102 and which operations to schedule for the target device 104. Example resource factors include, but are not limited to, a battery level of the target device 104, a privacy preference of a user that wears the earn-worn device 102, and a security preference of the user.

Step 1604 is a determination of whether an operation is to be scheduled. Example operations include, but are not limited to calibration (e.g., step 808), scanning the actuation table (e.g., step 810), and performing the action in the actuation table 612 (e.g., step 816). Assuming that there is another operation to be scheduled, step 1606 is performed. Step 1606 is a determination of whether the operation should be scheduled for the earn-worn device 102 or for the target device 104. The operation is then either scheduled for the earn-worn device 102 (in step 1608) or for the target device 104 (in step 1610). Scheduling the operation may include instructing the earn-worn device 102 and the target device 104 which steps of process 800 each is to perform. Scheduling the operation may include instructing the earn-worn device 102 and/or the target device 104 which of process 1000, 1100, 1200, 1400 and/or 1500 is to be performed.

Figure 17:
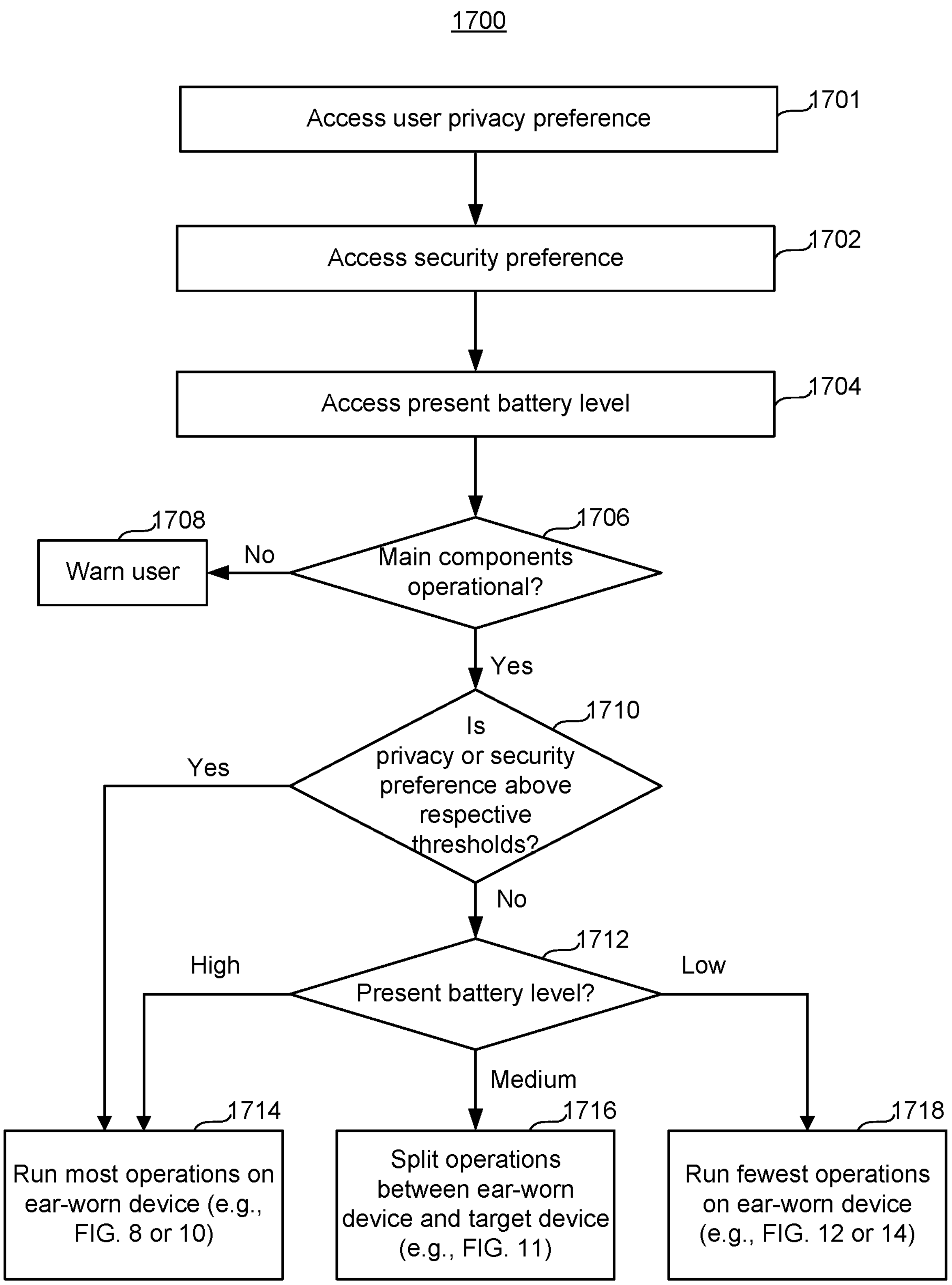
FIG. 17 is a flowchart of that provides further details of a process of scheduling operations for either the earn-worn device or the target device.

FIG. 17 is a flowchart of that provides further details of a process 1700 of scheduling operations for either the earn-worn device 102 or the target device 104. Process 1700 could be performed by the earn-worn device 102, the target device 104, or another device. Process 1700 extends battery life (of the ear-worm device 102) while meeting security and privacy preferences of the user.

Step 1701 includes accessing user privacy preferences. These preferences may be input by the user on the target device 104 and stored thereon. Step 1702 includes accessing security preferences. These security preferences may be input by the user on the target device 104 and stored thereon. Step 1704 includes accessing a present battery level of the earn-worn device 102.

Step 1706 includes a determination of whether the main components of the earn-worn device 102 are operational. The main components may include, but are not limited to, electrode front-end 610, DSP 606, device operating controller 604, audio front-end, and RF transceiver 222. If any of these main components is not operational, then a warning may be sent to the user in step 1708. The warning could be sent in any convenient manner, such as the target device 104 displaying a warning message.

If the main components are operational, then step 1710 includes a determination of whether either the privacy preference or the security preference is above a respective threshold. If so, step 1714 is performed. That is, if either the privacy preference is above a privacy threshold or the security preference is above a security threshold, step 1714 is performed. This has the effect of performing step 1714 if either the user desires to have high privacy or if the user desires high security, regardless of the battery level. Step 1714 includes running most operations on the in-ear electronic device 102. In one embodiment, step 1714 includes performing a calibration operation (e.g., step 806), a scanning operation (e.g., step 810) and an actuation operation (e.g., step 816) on the in-ear electronic device 102. Hence, all of process 800 may be performed on the in-ear electronic device 102. However, in some cases, it may be impractical or impossible to perform step 816 on the in-ear electronic device 102. Hence, step 1714 does not require performing the actuation operation. Rather, the actuation operation might be performed on the target device 104. In one embodiment, step 1714 includes performing process 1000 on the in-ear electronic device 102, with process 1500 performed on the target device 104.

If the privacy preference is below the privacy threshold and the security preference is below the security threshold, step 1712 is performed. Step 1712 is a check of the battery level of the in-ear electronic device 102. If the battery level is high (e.g., above a high threshold), then step 1714 is performed. If the battery level is low (e.g., below a low threshold), then step 1718 is performed. If the battery level is medium (e.g., between the low threshold and the high threshold), then step 1716 is performed.

Step 1718 includes running the fewest operations on the in-ear electronic device 102. In one embodiment, step 1718 includes performing process 1400 on the in-ear electronic device 102. Process 800 may be performed on the target device 104 in combination with process 1400 performed on the in-ear electronic device 102. In one embodiment, step 1718 includes performing a calibration operation (e.g., step 806), a scanning operation (e.g., step 810) and an actuation operation (e.g., step 816) on the target device 104. In one embodiment, process 1200 is performed in step 1718.

Step 1716 includes splitting operations between the in-ear electronic device 102 and the target device 104. In one embodiment, process 1100 is performed. In one embodiment, step 1716 includes performing a calibration operation (e.g., step 806) on the in-ear electronic device 102; but performing a scanning operation (e.g., step 810) and the actuation operation (e.g., step 816) on the target device 104.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An in-ear electronic device, comprising:
- a housing shaped to be inserted into an ear canal of a human;
- a set of electrodes configured to be in contact with the human when the housing is inserted into the ear canal, the set of electrodes configured to sense at least one electrical signal;
- an antenna;
- a radio frequency (RF) transceiver coupled to the antenna, the RF transceiver comprising a receiver, an active transmitter, and a passive backscatter transmitter, wherein the receiver is configured to receive RF signals on the antenna, the received RF signals carrying audio signals;
- an audio transducer configured to play the audio signals into the ear canal when the housing is inserted into the ear canal; and
- a processor coupled to the RF transceiver, the audio transducer, and the set of electrodes, wherein the processor is configured to:
  - provide an audio signal to the audio transducer based on an input RF signal received on the antenna, wherein the audio transducer plays the audio signal into the ear canal;
  - form an output signal based on the at least one electrical signal from the set of electrodes;
  - determine whether a magnitude of the RF signal is above a threshold; and
  - select the active transmitter or the passive backscatter transmitter to transmit the output signal based on the determination;
- wherein in response that the magnitude of the RF signal is above the threshold, the passive backscatter transmitter is selected to passively backscatter the input RF signal on the antenna by modulating a reflection of the input RF signal with the output signal to wirelessly transmit the output signal; and
- wherein in response that the magnitude of the RF signal is less than the threshold, the active transmitter is selected to modulate a carrier wave with the output signal to wirelessly transmit the output signal.

2. The in-ear electronic device of claim 1, wherein the processor is further configured to:
- process the at least one electrical signal to determine an actuation signal; and
- include the actuation signal in the output signal.

3. The in-ear electronic device of claim 2, wherein the processor is configured to determine the actuation signal by analyzing the at least one electrical signal and an actuation table, wherein the actuation table includes bio-potential patterns of electrical signals and corresponding actions.

4. The in-ear electronic device of claim 1, wherein the processor is further configured to include the at least one electrical signal in the output signal.

5. The in-ear electronic device of claim 4, wherein the at least one electrical signal comprises an electroencephalogram (EEG) signal.

6. The in-ear electronic device of claim 4, wherein the at least one electrical signal comprises an electromyogram (EMG) signal.

7. A system, comprising:
- a target electronic device comprising a radio frequency (RF) transceiver; and
- an in-ear electronic device having a housing configured to fit within an ear canal of a human, wherein the in-ear electronic device comprises:
  - a set of electrodes comprising a reference electrode and at least one sensing electrode, wherein the set of electrodes is configured to sense one or more electrical signals from the ear canal;
  - an antenna;
  - an RF transceiver comprising a receiver, an active transmitter, and a passive backscatter transmitter, wherein the receiver is configured to receive an input RF signal on the antenna from the target electronic device, the input RF signal carrying audio signals;
  - an audio-transducer located on the housing such that the audio-transducer resides in the ear canal when the housing is inserted into the ear canal; and
  - a processor coupled to the set of electrodes to receive the one or more electrical signals, the processor coupled to the RF transceiver to receive the audio signal, and the processor coupled to the audio transducer, wherein the processor is configured to:

drive the audio-transducer with the audio signal from the RF transceiver;

form an output signal based on the one or more electrical signals from the set of electrodes;

determine whether a magnitude of the RF signal is above a threshold; and select the active transmitter or the passive backscatter transmitter to transmit the output signal based on the determination;

wherein in response that the magnitude of the RF signal is above the threshold, the passive backscatter transmitter is selected to passively backscatter the input RF signal on the antenna by modulating a reflection of the input RF signal with the output signal to wirelessly transmit the output signal; and wherein in response that the magnitude of the RF signal is less than the threshold, the active transmitter is selected to modulate a carrier wave with the output signal to wirelessly transmit the output signal.

8. The system of claim 7, wherein the processor is configured to:

process the one or more electrical signals to determine an actuation signal; and include the actuation signal in the output signal.

9. The system of claim 8, wherein the target electronic device is configured to:

receive the passively backscattered input RF signal having the actuation signal; and respond to the actuation signal to perform an action at the target electronic device.

10. The system of claim 8, wherein the processor is configured to determine the actuation signal by analyzing the at least one electrical signal and an actuation table, wherein the actuation table includes bio-potential patterns of electrical signals and corresponding actions.

11. The system of claim 7, wherein the processor is configured include the one or more electrical signals in the output signal.

12. The system of claim 7, wherein the processor is further configured to:

schedule operations to determine an actuation signal that is based on the one or more electrical signals;

perform operations that are scheduled for the in-ear electronic device; and instruct the target electronic device to perform operations that are scheduled for the target device.

* * * * *